US012631744B2

(12) United States Patent
Hoffmann et al.

(10) Patent No.: US 12,631,744 B2
(45) Date of Patent: May 19, 2026

(54) METHOD, RADAR SYSTEM AND VEHICLE FOR SIGNAL PROCESSING OF RADAR SIGNALS

(71) Applicant: Symeo GmbH, Neubiberg (DE)

(72) Inventors: Marcel Hoffmann, Erlangen, DE (US); Michael Gottinger, Buckenhof (DE); Martin Vossiek, Fürth (DE); Mark Christmann, Munich (DE); Peter Gulden, Erding (DE)

(73) Assignee: Symeo GmbH, Neubiberg (DE)

( * ) Notice: Subject to any disclaimer, the term of this patent is extended or adjusted under 35 U.S.C. 154(b) by 363 days.

(21) Appl. No.: 18/044,163

(22) PCT Filed: Sep. 3, 2021

(86) PCT No.: PCT/EP2021/074356
§ 371 (c)(1),
(2) Date: Mar. 6, 2023

(87) PCT Pub. No.: WO2022/049241
PCT Pub. Date: Mar. 10, 2022

(65) Prior Publication Data
US 2023/0314588 A1     Oct. 5, 2023

(30) Foreign Application Priority Data
Sep. 7, 2020     (DE) ......................... 102020123293.4

(51) Int. Cl.
*G01S 13/58*         (2006.01)
*G01S 7/35*          (2006.01)
*G01S 13/87*         (2006.01)
(52) U.S. Cl.
CPC ............ *G01S 13/589* (2013.01); *G01S 7/356* (2021.05); *G01S 13/878* (2013.01)

(58) Field of Classification Search
CPC ...... G01S 13/589; G01S 7/356; G01S 13/878; G01S 13/87; G01S 2013/93271;
(Continued)

(56) References Cited

U.S. PATENT DOCUMENTS

| | | | |
|---|---|---|---|
| 6,628,227 B1 | 9/2003 | Rao et al. | |
| 10,914,836 B2 * | 2/2021 | Lee ....................... | G01S 13/931 |

(Continued)

FOREIGN PATENT DOCUMENTS

| | | |
|---|---|---|
| CN | 102253391 | 11/2011 |
| CN | 109917390 | 6/2019 |

(Continued)

OTHER PUBLICATIONS

"Chinese Application Serial No. 202180073523.7, Office Action mailed Feb. 26, 2026", W English Translation, 22 pgs.

*Primary Examiner* — Vladimir Magloire
*Assistant Examiner* — Naomi M Wolford
(74) *Attorney, Agent, or Firm* — Schwegman Lundbeg & Woessner, P.A.

(57) ABSTRACT

A method for signal processing of radar signals of a radar system (100) has at least two radar units (10, 20) arranged at a known distance from one another. At least one spatial field of vision (FoV) of the radar system (100) is captured with radar signals of the at least two radar units (10, 20). A discrete total coordinate system is generated from the field of vision (FoV). Measurement data of the at least two radar units (10, 20) of the radar system (100) generated by the detection of the field of vision (FoV) are co-registered. A multidimensional, vector velocity ($\vec{v}$) for at least one resolution cell of the discrete total coordinate system and/or a multidimensional, vector velocity ($\vec{v}_{100}$) for the radar system (100) are generated. At least one spatial sub-field of the field of vision (FoV) is constructed using the determined (Continued)

vector velocity ($\vec{v}$) and/or the vector velocity ($\vec{v}_{100}$) for the radar system and with the measurement data of at least one of the radar units (10, 20).

18 Claims, 14 Drawing Sheets

(58) Field of Classification Search
CPC . G01S 2013/93272; G01S 2013/93274; G01S 7/352; G01S 13/931; G01S 13/9004
See application file for complete search history.

(56) References Cited

U.S. PATENT DOCUMENTS

| | | | | |
|---|---|---|---|---|
| 11,448,754 | B2 * | 9/2022 | Cattle | .................. G01S 13/9058 |
| 11,719,815 | B2 * | 8/2023 | Sugae | ................... G01S 15/104 |
| | | | | 367/127 |
| 2009/0157314 | A1 | 6/2009 | Jordan et al. | |
| 2019/0079177 | A1 | 3/2019 | Lee et al. | |
| 2019/0187267 | A1 * | 6/2019 | Li | .......................... G01S 13/931 |
| 2020/0158861 | A1 | 5/2020 | Cattle et al. | |

FOREIGN PATENT DOCUMENTS

| | | | | |
|---|---|---|---|---|
| CN | 110007304 | | 7/2019 | |
| CN | 110325876 | | 10/2019 | |
| CN | 116507940 | A | 7/2023 | |
| EP | 2068173 | | 6/2009 | |
| EP | 3367121 | A1 * | 8/2018 | ............. G01S 13/42 |
| EP | 3502737 | | 6/2019 | |
| JP | 2001141820 | | 5/2001 | |
| KR | 20120089020 | | 8/2012 | |

* cited by examiner

N+ times

Distance

O h l

Angle

Fig. 13 y

FoV

O h

FoV20

FoV10

FoV10

FoV20

Partial radar image of radar unit 10     Partial radar image of radar unit 10

Partial radar image of radar unit 10     Partial radar image of radar unit 10

METHOD, RADAR SYSTEM AND VEHICLE FOR SIGNAL PROCESSING OF RADAR SIGNALS

CROSS-REFERENCE TO RELATED APPLICATIONS

This application is a U.S. National Stage Application under 35 U.S.C. § 371 of International Application No. PCT/EP2021/074356, filed Sep. 3, 2021, which claims the benefit of the German Patent Application Serial No. 102020123293.4, filed Sep. 7, 2020, the contents of each of which are herein incorporated by reference in their entirety for all purposes.

FIELD OF THE INVENTION

The invention relates to a method for signal processing of radar signals, a radar system, and a radar equipped vehicle.

BACKGROUND

Radar systems are increasingly used in the ambient area detection of vehicles, for example in the automotive sector. In addition to optical sensors such as monoscopic or stereoscopic camera systems or light detection and ranging (lidar) sensors, precise radial distance and speed measurements are made possible with radar systems.

Reliable ambient area detection of vehicles (automobiles) can be seen as a prerequisite for the further automation of, sometimes safety-critical, driving functions of the vehicles, such as in driver assistance systems, highly automated driving systems and fully autonomous driving systems.

Known systems emit or transmit frequency-modulated continuous-wave signals (FMCW signals), so-called chirp-sequence radar units, which are used for ambient area detection. In a chirp-sequence radar unit, the radar unit transmits a periodic sequence of I FMCW signals, each of which has a linear frequency ramp.

Such radar units known from the prior art have at least one transmitting antenna (or also several transmitting antenna elements of a transmitting antenna array) and several receiving antenna elements, which can be operated as a receiving antenna array, wherein the receiving antenna array can be designed both one- and two-dimensionally.

Such a radar unit can be used, for example, to measure (determine) the radial distance and/or the radial velocity of one (or more) objects located in the field-of-view (FoV) of the radar unit relative to the radar unit.

Typically, the determination of the radial distance and/or radial velocity relative to the radar unit can be performed with a chirp-sequence radar unit, wherein a transmit signal is transmitted or radiated from the at least one transmitting antenna of the radar unit via a reciprocal transmission channel, which is reflected by at least one object and received by the receiving antenna elements of the receiving antenna array of the radar unit.

The received signals of the receiving antenna array of the radar unit can be processed in such a way that a three-dimensional result space is created, which contains a (radial) distance $d_j$, a radial velocity $v_{r,j}$ and an azimuth angle $\vartheta_j$ of the object relative to the radar unit.

In this case, the achievable angular resolution (e.g., for the azimuth angle) is limited by the half-value width or the 3 dB-aperture angle of the receiving antenna array used.

For receiving antenna arrays (an equidistant aperture assignment), where the individual receiving antenna elements are arranged equidistantly, as well as for a rectangular windowing, the angular resolution results in $$\Delta\alpha_{3dB} \approx 51° \cdot \frac{\lambda}{L}, \tag{1}$$

where L indicates the dimension(s) (aperture size) of the receiving antenna array in the azimuth and/or elevation direction, depending on whether it is a one- or two-dimensional receiving antenna array.

However, especially in the automotive sector, the maximum possible dimensions of the receiving antenna array, i.e. the aperture size L, are strictly limited due to a small installation space as well as for design and cost reasons. As a consequence, the realizable angular resolutions are often too low for road safety applications.

In addition, to improve the sidelobe attenuation (which, for an equidistant aperture assignment, is 13.3 dB is), window functions are typically used. However, this has the consequence that the angular resolution given above is further degraded (by about a factor of 2) in practical applications.

It is therefore the object of the invention to improve the disadvantages of the solutions known from the prior art and to provide an alternative possibility for a method of processing radar signals of a radar system as well as a corresponding radar system, which preferably has an improved angular resolution without increasing the physical dimensions of the aperture of the receiving antenna array.

SUMMARY

A method for signal processing of radar signals of a radar system (100) has at least two radar units (10, 20) arranged at a known distance from one another. At least one spatial field of vision (FoV) of the radar system (100) is captured with radar signals of the at least two radar units (10, 20). A discrete total coordinate system is generated from the field of vision (FoV). Measurement data of the at least two radar units (10, 20) of the radar system (100) generated by the detection of the field of vision (FoV) are co-registered. A multidimensional, vector velocity ($\vec{v}$) for at least one resolution cell of the discrete total coordinate system and/or a multidimensional, vector velocity ($\vec{v}_{100}$) for the radar system (100) are generated. At least one spatial sub-field of the field of vision (FoV) is constructed using the determined vector velocity ($\vec{v}$) and/or the vector velocity ($\vec{v}_{100}$) for the radar system and with the measurement data of at least one of the radar units (10, 20).

BRIEF DESCRIPTION OF THE FIGURES

In the following, the invention is further explained by means of non-limiting exemplary embodiments with reference to the accompanying drawings, wherein:

FIG. 13 shows an exemplary evaluation using a delay-and-sum beamformer for a radar unit;

FIG. 14 shows an example of measurement data of two radar units co-registered in a common total coordinate system, which are available after method step VS4;

In the following description, the same reference numbers are used for identical parts and parts with the same effect.

DETAILED DESCRIPTION

Figure 1:
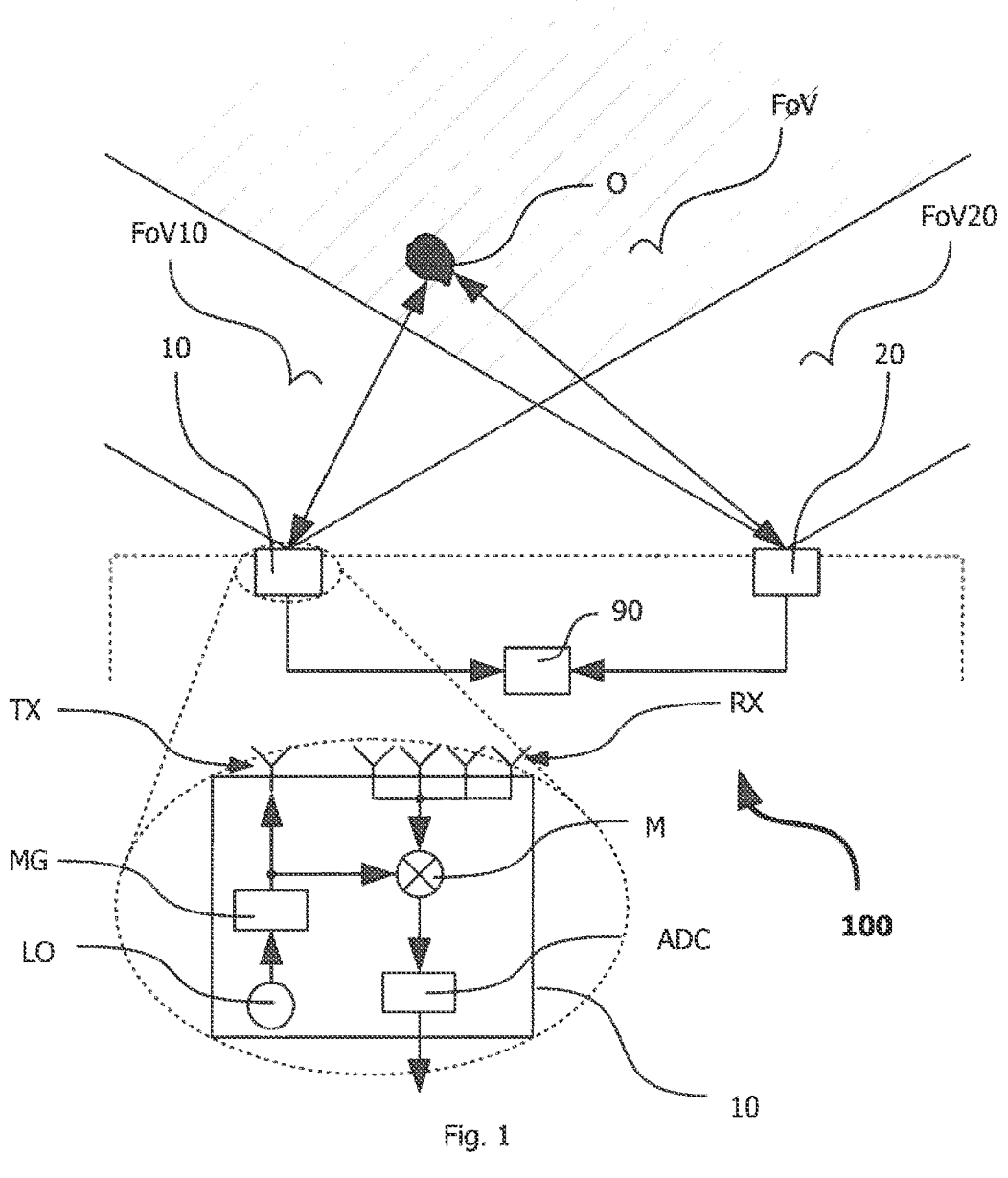
FIG. 1 shows a schematic arrangement of a radar system according to an embodiment of the invention.

The object of the invention is solved by a method for signal processing of radar signals of a radar system, in particular a vehicle radar system, preferably an automotive radar system, having at least two radar units arranged at a distance from each other, comprising the following steps:

capturing at least one spatial field of vision of the radar system with radar signals of the at least two radar units, preferably in such a way that fields of vision of the individual radar units at least partially overlap in the field of vision of the radar system;

generating a discrete total coordinate system of the field of vision (in particular in which measurement data of the at least two radar units of the radar system generated by the detection of the field of vision are co-registered);

preferably determining a, preferably multidimensional, vector velocity for at least one resolution cell (pixel or voxel) of the discrete total coordinate system and/or a, preferably multidimensional, vector velocity for the radar system;

reconstructing at least one spatial sub-field of the field of vision by means of the determined vector velocity and/or the vector velocity for the radar system and by means of the measurement data of at least one of the radar units.

One aspect of the invention is a discrete total coordinate system generated from measurement data of at least two radar units of a radar system which cover a common field of vision (in which the fields of vision of the individual radar units at least partially, possibly only partially, overlap). The measurement data of the at least two radar units are co-registered in the discrete total coordinate system, which makes it possible to detect any objects located in the common field of vision from at least two (different) perspectives.

In the generated discrete total coordinate system of the (common) field of vision, a vector velocity can be determined for at least one resolution cell of the discrete total coordinate system, which e.g. may belong to an object (or radar target), for this at least one resolution cell (pixel or voxel).

Determining the vector velocity of the at least one resolution cell (which may belong to an object or radar target, for example) from the discrete total coordinate system opens the possibility of improving the angular resolution based on the determined vector velocity. For example, a partial radar image with increased angular resolution (azimuth resolution) can be calculated (reconstructed) by applying a discrete inverse synthetic aperture radar (inverse SAR) method on a resolution cell-by-resolution (pixel-by-pixel or voxel-by-voxel) basis. Reconstruction is carried out in a spatial sub-field in which the vector velocity of at least one resolution cell (which may belong to a detected object, for example) is known.

In a static scene where several static (non-moving) objects are detected, the vector velocity of the radar system, i.e. the self-motion (ego-motion estimation) or the trajectory of the radar system, can be determined from the discrete total coordinate system.

Such static scenarios can be assumed especially in automotive applications. This is the case, for example, when detecting the lateral ambient area of a vehicle (side looking), especially with few moving objects.

Based on the determined vector velocity of the radar system, an ambient radar image can additionally or alternatively be generated, for example, using a synthetic aperture radar method, in which an improved angular resolution is obtained. The ambient radar image generated in this way is not limited to the common field of vision of the at least two radar units.

If the vector velocity of the radar system is determined, the measurement data for fields of vision covered by only one radar unit can also be used to generate an ambient radar image using, for example, a synthetic aperture radar method that has improved angular resolution.

In particular, the method can be used for vehicle applications, such as automotive applications, in which at least two radar units detect a common field of vision and at least substantially time-synchronized radar units of a radar system are used.

By using a synthetic aperture, the resulting angular resolution is no longer dependent on the size of the real aperture but can be determined object-dependently from the portion of the object trajectory lateral to the radar system.

For example, improved angular resolution allows multiple scattering centers of sometimes complex objects to be detected. Furthermore, the method can be used for any object distribution (radar target distribution) and object movements without assuming knowledge of the radar system's own motion.

Furthermore, the radar units of the radar system can additionally be arranged in a vertically distributed manner, wherein in particular the horizontal offset is maintained. In general, at least two radar units of the radar system can be arranged horizontally and/or at least two radar units of the radar system can be arranged vertically and/or at least two radar units can be arranged at an oblique angle relative to the horizontal and vertical.

The radar system may include at least two or at least three or at least four or more radar units (preferably having at least a partially common field of vision).

Optionally, the radar units of the radar system (in the case of optionally at least three radar units) can be arranged in at least two directions (e.g., horizontally and vertically). In this case, the inverse SAR reconstruction can be performed, for example, in a three-dimensional, discretized space, which additionally enables an interferometric evaluation of the height of objects. In this case, the vector velocity of a voxel (or a three-dimensional resolution cell) can be determined from the co-registered measurement data of the radar units of the radar system.

A discrete total coordinate system can be understood as a coordinate system into which measurement data for a field of vision recorded from several (different) perspectives, for example from several (different) radar units, are co-regis- tered (inserted) and which is converted into discrete reso- lution cells, such as pixels (in the two-dimensional) or voxels (in the three-dimensional), of the continuous total coordinate system using a discretization method.

Co-registration can be understood as a transformation process in which several measurement data (sets) from different radar units are transferred into a common coordi- nate system.

In one embodiment, reconstructing (the spatial sub-field of the field of vision) may comprise the following step:

Generating at least one partial radar image for a spatial sub-field of the field of vision, in which the at least one resolution cell is located, on the basis of the measure- ment data of at least one of the radar units and on the basis of the vector velocity of the at least one resolution cell determined (with at least two radar units), prefer- ably using an inverse synthetic aperture radar method.

With the measurement data of at least one radar unit and the previously determined vector velocity of the at least one resolution cell, it is possible to generate a partial radar image that has a higher angular resolution than the radar image in which only the measurement data of both radar units were co-registered. Due to the higher angular resolution in the (partial) radar image, contours of objects are imaged (sig- nificantly) sharper.

In particular, a partial radar image is understood to be a partial section in the discrete total coordinate system that has a higher angular resolution.

In a further embodiment, reconstructing (the spatial sub- field of the field of vision) may further comprise, in par- ticular, the following step:

Generating at least one ambient radar image for a spatial ambient area detected by at least one of the radar units based on the measurement data of the at least one radar unit detecting the ambient area and based on the vector velocity of the radar system, preferably using a syn- thetic aperture radar method.

By determining the vector velocity of the radar system, it can be possible, in particular with a SAR method, to calculate an ambient radar image from the measurement data of at least one radar unit, which has a higher angular resolution.

Due to the higher angular resolution in the ambient radar image, contours of objects are (much) sharper. The higher- resolution ambient radar image is also not limited to the common field of vision of the two radar units but can contain areas that are only detected by one radar unit.

It is also possible that the vector velocity of the radar system is determined by additional sensor technology, such as odometric and/or by using a global navigation satellite system and/or by inertial sensor technology.

In another embodiment, the method further comprises the following step:

Detecting at least one object located in the field of vision in the discrete total coordinate system, preferably by determining amplitude maxima using dynamic and/or constant power thresholds; wherein a, preferably mul- tidimensional, vector velocity of at least one resolution cell is determined for the at least one detected object.

By detecting the at least one object, a (multidimensional) vector velocity can be determined for the at least one object.

In particular, for a spatial sub-field of the field of vision in which the at least one detected object is located, at least one partial radar image is generated using the measurement data from at least one of the radar units and using the vector velocity assigned for the at least one detected object, pref- erably using an inverse synthetic aperture radar method.

Using the inverse SAR method, a partial radar image with a higher angular resolution can be generated based on the (multidimensional) vector velocity of the object for a spatial sub-field in which the detected object is located. In the partial radar image, the contours of the detected object are more pronounced.

Preferably, a plurality of objects located in the field of vision are detected in the discrete total coordinate system, wherein a vector velocity, preferably multidimensional, of at least one resolution cell is determined for each detected object, and wherein a (partial) radar image is generated for each detected object on the basis of the measurement data from at least one of the radar units and on the basis of the vector velocities of the respective detected objects, prefer- ably using the inverse synthetic aperture radar method.

By detecting a large number of objects in the field of vision and by determining the vector velocities for each detected object, a partial radar image can be generated for each object that has a higher angular resolution than the radar image in which only the measurement data of both radar units were co-registered.

In particular, the measurement data of the respective radar units generated by detecting the field of vision includes distance data, radial velocity data, and angle data, wherein the angle data preferably includes angle data in the azimuth direction and in the elevation direction.

It is preferred that for generating the discrete total coor- dinate system, a discretization, preferably equidistant and/or Cartesian, of the field of vision represented in the total coordinate system is carried out.

By discretizing the field of vision represented in the total coordinate system into resolution cells (e.g., pixels or voxels), it is possible to calculate a vector velocity for individual resolution cells and to achieve increased angular resolution for the (partial) reconstruction area by applying the inverse SAR method to a (partial) reconstruction area in which the resolution cell is located.

In particular, a complex discretization is also conceivable, in which the resolution cell size in the distance-angle diagram is changed depending on the distance, so that a reduced number of resolution cells can be achieved, and thus computational effort can be saved.

Preferably, the distance data and angle data of the radar units are (quantitatively) superposed to generate the discrete total coordinate system, whereby the measurement data of the radar units can be co-registered in the discrete total coordinate system. Through the superposition, an amplitude as well as a radial velocity (per radar unit used) can be assigned to each resolution cell of the discrete total coordinate system in the common field of vision.

In particular, the inverse synthetic aperture radar method is applied to the spatial sub-field in the discrete total coordinate system in which the detected object(s) is/are located, preferably wherein the sub-field has a rectangular shape, an elliptical shape, or a circular shape.

Preferably, the inverse synthetic aperture radar method includes one of the following: Range Doppler, Omega-K, Phase Shift Migration, Holography, or Extended Chirp Scaling.

By applying one of the previously mentioned methods, the inverse SAR method can be (directly) realized.

In a further embodiment, at least one vector velocity error of the determined vector velocity of the at least one resolution cell or the at least one detected object is determined and corrected from the generated partial radar images of the two radar units.

When determining the vector velocity, errors can occur that can lead to systematic phase errors in the reconstructed/generated radar images, causing the positions of the detected objects to be reconstructed with errors. By determining and correcting any vector velocity errors, these systematic phase errors can be corrected.

Preferably, determining, and correcting vector velocity errors includes the following steps of:

comparing the partial radar image generated by one of the at least two radar units for a spatial sub-field of the field of vision in which the at least one resolution cell and/or the at least one detected object is located, with the partial radar image of the same spatial sub-field generated by the other of the at least two radar units;

changing the vector velocity by one vector velocity change, provided that comparing the partial radar images reveals that there is a difference between the two partial radar images, wherein the comparing and modifying is preferably iteratively repeated until the difference between the two partial radar images is below a predetermined threshold. In this way, the vector velocity errors can be successively reduced. The change is made in a targeted manner (not arbitrarily), in particular, by using image deviations to calculate which vector velocity describes the actual vector velocity better than the incorrect vector velocity or in which direction the vector velocity must be changed.

Preferably, an overall radar image of the common field of vision is generated from the individual partial radar images of the respective radar units, whereby an image can be generated in which the previously generated partial radar images of the detected objects are inserted and which contains an improved angular resolution and more precise object contours.

For example, the discrete total coordinate system in which the measurement data of the radar units were co-registered can be used as a basis into which the partial radar images can be inserted by a suitable calculation operation, such as addition, multiplication or substitution, of the corresponding sub-fields.

Preferably, further object detection or classification can be performed in the overall radar image, such as by clustering algorithms like Density-Based-Spatial-Clustering-of-Applications-with-Noise or Connected-Component-Labeling or other methods of image and pattern recognition, such as machine learning methods like deep learning approaches.

It is possible here to generate a separate overall radar image for each of the radar units used and/or to generate an overall radar image of the radar system from a combination of all radar units used.

Preferably, determining a, preferably multidimensional, vector velocity is carried out for at least a portion of, preferably for all, resolution cells of the discrete total coordinate system of the field of vision, wherein at least a portion of, preferably the entire, field of vision is processed in the discrete total coordinate system, preferably using an inverse synthetic aperture radar method.

In a further embodiment, a detection of at least one object located in the field of vision is carried out in a distance-radial velocity diagram and/or a distance-angle diagram generated from the measurement data of one of the radar units, preferably by determining amplitude maxima by using dynamic and/or constant power threshold values.

In a further embodiment, multiple, preferably multidimensional, vector velocities are determined for at least one resolution cell of the discrete total coordinate system of the field of vision (in particular, provided that multiple objects are detected for the resolution cell in the distance-radial velocity diagram and/or in the distance-angle diagram).

This makes it possible to determine several vector velocities for one resolution cell in the distance-angle diagram. It is particularly useful if a higher number of radar units (e.g., at least three or at least four or at least eight) is used, as this simplifies the assignment of the different radial velocities.

In particular, the acquisition of the at least one field of vision of the radar system is repeated periodically, wherein the measurement data of the radar units are combined into an overall measurement data set, wherein the overall measurement data set is processed using the above method.

By increasing the trajectories due to the object motion during the measurement, a larger aperture can be synthesized, resulting in an improvement of the angular resolution, for example by a factor of 4.

Preferably, measurement data in which the measurement data of cross paths of the radar signals between the radar units of the radar system are also included are processed using the above method, provided that the radar units of the radar system are operated coherently.

By operating the radar units of the radar system in a coherent manner, the cross path between the at least two radar units can optionally also be assumed to be reciprocal, allowing the two cross path spectra to be merged (fused) in a separate step so that a signal-to-noise ratio for the cross path can be improved (increased).

When processing the measurement data of the radar units, the reconstruction of the fused cross path can thus additionally be taken into account, which on the one hand increases the perspective gain and on the other hand improves the signal-to-noise ratio, enabling an improved evaluation of the overall radar image.

In a further embodiment, in which the radar system has a plurality of mutually spaced radar units (e.g., at least three or at least four or at least eight), a plurality of spatial fields of vision are detected in each case by at least two radar units of the radar system, and the measurement data of the radar units are processed, e.g., in pairs, for each of the fields of vision using the above method.

By acquiring and processing additional fields of vision in pairs, a comparatively comprehensive ambient area of the radar system can be acquired in a simple manner.

The object is further solved by a radar system, in particular a vehicle radar system, preferably an automotive radar system, comprising at least two radar units, wherein preferably the radar units are arranged spaced apart from each other, preferably at a predetermined distance, wherein the radar system is designed to carry out the above method.

Furthermore, the object is solved by a radar system, in particular a vehicle radar system, preferably an automotive radar system, which has a plurality of radar units, wherein a plurality of spatial fields of vision of at least two radar units of the radar system each at least partially overlap, wherein the radar units are arranged spaced apart from one another, preferably at a predetermined distance, wherein the radar system is designed to perform the above method.

In particular, at least one radar unit of the at least two or the plurality of radar units has a computational module configured to perform the above method, eliminating the need for an additional computational unit.

Alternatively, or additionally, the radar system further comprises a, preferably central, computing unit (master computing unit), which is configured to receive the measurement data of the computing units and to perform the above procedure.

Furthermore, the object is solved by a vehicle, in particular an automobile, which has the above radar system. Also conceivable are mobile devices, such as manned or unmanned aircraft or preferably passenger cars and/or trucks, which have the radar system according to the invention.

In addition, the radar system according to the invention can also be mounted on static equipment. For example, smaller radar units can be placed at the side of the road during traffic monitoring and the movement of vehicles passing laterally by them can be used to achieve good azimuth resolutions.

In addition, it would be conceivable to position the radar units of the radar system at airports facing the sky and to generate relatively large apertures (and thus very good resolutions) by the movement of the aircraft. This would significantly exceed the resolutions of conventional radar.

All features and associated advantages described in connection with the method according to the invention for signal processing of radar signals of a radar system are applicable and transferable to the radar system according to the invention or the vehicle according to the invention. The method steps explained above can be implemented in the radar system or vehicle as corresponding configurations (e.g., of a control and/or computing unit) individually or in combination.

In an exemplary embodiment illustrated in FIG. 1, the radar system 100 has two radar units 10, 20 that are spatially separated from each other. Each radar unit 10, 20 has a spatial field of vision (field of view) FoV10, FoV20 that extends from the respective radar unit 10, 20 at a certain aperture angle. The spatial fields of vision FoV10, FoV20 of the radar units 10, 20 at least partially overlap in a spatial detection range or field of vision FoV of the entire radar system 100. The two radar units 10, 20 are communicatively connected to a (central) computing unit 90. The communicative connection between the radar units 10 and 20 can be wired or wireless. The radar system 100 shown in FIG. 1 may be arranged, for example, in a vehicle, preferably an automobile.

FIG. 1 shows an object O that is located in a detection area FoV of the radar system 100. The object O can move freely relative to the radar system 100, at an initially unknown speed. In addition, the radar unit 10 is shown enlarged in FIG. 1. In the present exemplary embodiment, the radar unit 20 is constructed in the same way as the radar unit 10. In this exemplary embodiment, the radar unit 10 has its own local oscillator LO, a modulation generator MG, at least one high-frequency mixer M, a transmitting antenna TX, and a receiving antenna array RX that includes four receiving antenna elements.

The local oscillator LO is connected to the modulation generator MG, in which a transmit signal can be generated. The modulation generator MG is in turn connected to the transmitting antenna TX, so that it can transmit or radiate the transmit signal. The modulation generator MG is also connected to the high frequency mixer M, in which the transmit signal is mixed with a received signal of the receiving antenna array.

In this exemplary embodiment, the radar units 10, 20 are arranged (or, for example, built into a vehicle) in such a way that the positions of the radar units relative to each other are at least substantially known (at least in the range of centimeters). The radar units 10, 20 can be arranged, for example, on the side or the front of a vehicle in such a way that the fields of vision (FoV10, FoV20) of the radar units 10, 20 overlap in at least one spatial field of vision FoV.

In order to achieve at least rough temporal synchronization of the transmit signals of the radar units 10, 20, such as in the range of a few milliseconds, for example, the radar units 10, 20 can be connected via a trigger line and/or controlled via a reference clock.

The dimensioning of the radar units 10, 20 as well as the modulation of the transmit signals are designed so that each radar unit 10, 20 can determine object parameters (distance, radial velocity, and angle) of an object located in the (overlapping) field of vision FoV at least approximately simultaneously in the common field of vision.

When transmitting the various transmit signals (radar signals), a multiplexing method can advantageously be used to reduce (avoid) interference between the radar units 10, 20.

Object parameters are determined with the aid of a modulated transmit signal which is transmitted or radiated by the transmitting antenna TX via a reciprocal transmission channel and is reflected by at least one object, wherein the transmit signal reflected at the object is received as a received signal by the receiving antenna elements of the receiving antenna array RX. Then, the received signal can be mixed into the baseband by a high-frequency mixer M. The baseband signals can then be sampled by the analog-to-digital converter ADC and digitally processed using a computing unit 90.

Information regarding the distance $d_j$ of an object O can be calculated by evaluating the signal propagation time over the transmission channel. The radial velocity $v_{r,j}$ of an object O is proportional to the frequency shift of the received signal based on the Doppler effect. By evaluating the phase differences along the receiving antenna array, it is possible to determine the azimuth angle $\vartheta_j$ of the object to the respective radar unit 10, 20.

The digital baseband signals can be processed in such a way that a three-dimensional result space produces a data set (distance $d_j$, radial velocity $v_{r,j}$, azimuth angle $\vartheta_j$). With a suitably sized antenna array having at least two antennas in the vertical plane of the real or virtual array, it is also possible to estimate an elevation angle for evaluating the three-dimensional position of an object.

From the data set, which spans the three-dimensional result space (distance, radial velocity, and azimuth angle), objects or radar targets and their object parameters can be detected and/or determined, for example, using a constant false alarm rate (CFAR) method in which a dynamic threshold value is specified. For this purpose, the data sets of the radar units 10, 20 can be transmitted to a computing unit 90 of the radar system 100, which is implemented as a separate computer, for example, or to a computing module of a (master) radar unit.

In the computing unit 90 or in the computing module, the different data sets can be transformed into a common coordinate system by co-registration using the information about the installation positions of the radar units 10, 20.

Due to the fact that the data sets contain radial velocities acquired from different perspectives of the radar units 10, 20, a vector velocity $\vec{v}$ can be determined from the radial velocities of the radar units 10, 20.

The radar units 10, 20 used in FIG. 1 are, for example, chirp sequence radar units 10, 20. However, other modulation forms are also conceivable.

Figure 2:
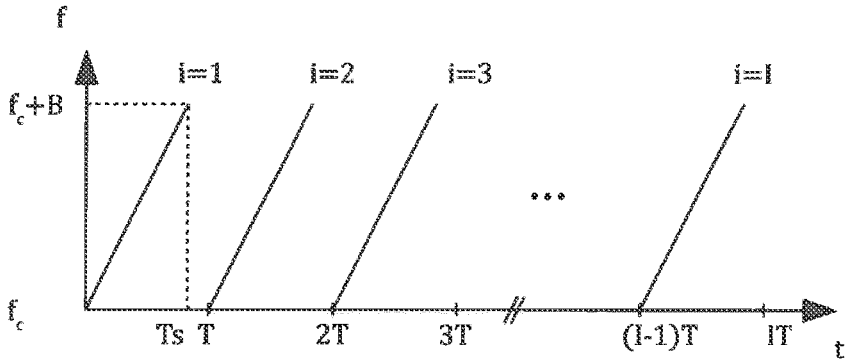
FIG. 2 shows a schematic representation of an FMCW transmit signal with a sequence consisting of multiple chirps.

Each chirp sequence radar unit 10, 20 transmits a transmit signal which is a periodic sequence of I frequency-modulated continuous-wave signals (FMCW) with a linear frequency ramp (a so-called chirp), which are generated by the local oscillator LO. Each individual chirp can be represented as $$s_{TX}(t) = e^{j2\pi\left(f_c t + \frac{\mu}{2}t^2\right)}, \tag{2}$$

wherein $f_c$ is the carrier frequency and $\mu = B/T_S$ indicate the sweep rate, i.e. the slope of the frequency ramp during the sweep duration. FIG. 2 shows an exemplary sequence of several chirps.

This signal is sent from a TX transmitting antenna via a transmission channel, which delays the signal by the signal propagation time $\tau(t)$ and attenuates it by a value A which attenuates the signal by a value proportional to the backscatter cross-section of the observed object.

The propagation time $\tau(t)$ results from the distances between transmitting antenna TX and the object, at which the transmitting signal is reflected, as well as between object and receiving antenna array RX according to $$\tau(t) = \frac{d_{TX}(t) + d_{RX}(t)}{c}, \tag{3}$$

wherein c is the propagation speed of the electromagnetic wave.

If the object moves relative to the radar system 100, the propagation time changes depending on the component $v_r$, which is radial to the respective radar unit 10, 20, of the actual vector velocity $\vec{v}$ of the object with time:

$$\tau(t) = \frac{d_{TX}(t=0) + d_{RX}(t=0)}{c} + \frac{2v_r}{c}t = \tau_0 + \frac{2v_r}{c}t \tag{4}$$

The resulting received signal, which is received at the receiving antenna array RX, $$s_{RX}(t) = A \cdot s_{TX}(t - \tau(t)) = A \cdot e^{j2\pi\left(f_c(t-\tau(t)) + \frac{\mu}{2}(t-\tau(t))^2\right)}, \tag{5}$$

is mixed with a mixer into the baseband, according to $$s_B(t) = s_{TX}(t)s_{RX}^*(t) = A \cdot e^{j2\pi\left(f_c\tau(t) + \frac{\mu}{2}\left(2t\tau(t) - \tau(t)^2\right)\right)}, \tag{6}$$

and subjected to low-pass filtering, wherein an operation * here stands for a complex conjugation. After the insertion of $\tau(t)$, for the so-called beat signal $s_B(t)$ there follows by approximation $$s_B(t) = A \cdot e^{j2\pi\left(f_c\tau_0 + \mu\tau_0 t + \frac{2v_r f_c}{c}t\right)} = A \cdot e^{j\Phi_B(t)}. \tag{7}$$

Various quadratic terms in the signal phase could be neglected due to practice-relevant approximations ($\tau \ll T_S$; $v_r \ll c$; $B \ll f_c$).

From the so-called beat frequency $f_B$ which can be evaluated, for example, with the aid of a Fourier transform of $s_B(t)$, it is not possible to directly determine the propagation time of the electromagnetic wave in the transmission channel or the object distance by transforming d because the beat frequency is frequency-shifted by an unknown Doppler component by the radial object velocity $v_r$:

$$f_B = \frac{1}{2\pi}\frac{d\Phi_B(t)}{dt} = \mu\tau_0 + \frac{2v_r f_c}{c} == \tag{8}$$

$$\mu\frac{d_{TX}(t=0) + d_{RX}(t=0)}{c} + \frac{2v_r f_c}{c} \approx \mu\frac{2d(t=0)}{c} + \frac{2v_r f_c}{c}$$

By using a periodic sequence of individual I single chirps, ambiguous distance measurements can be avoided (prevented).

Figure 3:
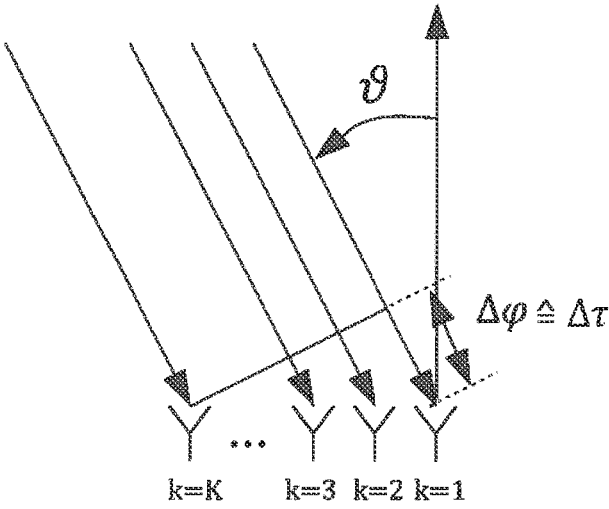
FIG. 3 shows a schematic diagram of a receiving antenna array containing multiple receiving antenna elements.

As shown in FIG. 3, the transmit signal is extended by the "slow time" $t_i = i \cdot T$, wherein the individual chirps are distinguished by the count variable i. The following therefore follows for the beat signal:

$$s_B(t, t_i) = A \cdot e^{j2\pi\left(f_c\tau_0 + \left(\mu\tau_0 + f_c\frac{2v_r}{c}\right)t + f_c\frac{2v_r}{c}t_i + \mu\frac{2v_r}{c}tt_i\right)} = A \cdot e^{j\Phi_B(t,t_i)} \tag{9}$$

Here, too, square t-resp. $t_i$-terms can be neglected. If now the Fourier transform is applied in the direction of the "fast time" t of $s_B(t, t_i)$, the following results in dependence of the considered chirp:

$$f_B(i) = \tag{10}$$

$$\frac{1}{2\pi}\frac{d\Phi_B(t, t_i)}{dt} = \mu\tau_0 + \frac{2v_r f_c}{c} + \mu\frac{2v_r}{c}i \cdot T = \mu\left(\tau_0 + \frac{2v_r}{c}i \cdot T\right) + \frac{2v_r f_c}{c}$$

A Fourier transform along the "slow time" $t_i$ of $s_B(t, t_i)$ provides a kind of Doppler frequency, which depends on the considered time in the "fast time" t. In a digital data set, this time corresponds to a certain sample along the dimension of the fast time:

$$f_D(t) = \frac{1}{2\pi}\frac{d\Phi_B(t, t_i)}{dt_i} = \frac{2v_r f_c}{c} + \mu\frac{2v_r}{c}t = \frac{2v_r}{c}(f_c + \mu t) \tag{11}$$

For a complete two-dimensional Fourier transform of $s_B(t, t_i)$ the fast- or slow-time dependencies of $f_D$ resp. $f_B$ can be eliminated with the smallest error on average, if $t = T_S/2$ and $i = I/2$ is assumed. From this follows

13

14

$$f_D\left(t = \frac{T_S}{2}\right) = \frac{2v_r}{c}\left(f_c + \frac{B}{T_S}\frac{T_S}{2}\right) = \frac{2v_r}{c}\left(f_c + \frac{B}{2}\right) \quad (12)$$

as well as $$f_B\left(i = \frac{1}{2}\right) = \mu\left(\tau_0 + \frac{v_r \cdot I \cdot T}{c}\right) + \frac{2v_r f_c}{c} \cdot s_{TX}(t) = e^{j2\pi\left(f_c t + \frac{\mu}{2}t^2\right)} \quad (13)$$

As a function of $f_D$ the radial velocity $v_r$ can be determined:

$$v_r = \frac{f_D}{f_c + \frac{B}{2}} \cdot \frac{c}{2} \quad (14)$$

If $v_r$ is used in $f_B$, the object distance $d(t=0)$ can be determined unambiguously from $\tau_0$:

$$d(t = 0) = \frac{c \cdot f_B - 2v_r \cdot f_c}{2\mu} - \frac{c \cdot v_r \cdot I \cdot T}{2} \quad (15)$$

The phase terms $$f_c \frac{2v_r}{c} t$$

as well as $$\mu \frac{2v_r}{c} t t_i$$

in $s_B(t, t_i)$ model the propagation time change caused by the target motion during a chirp. This causes a broadening of the maximum in the frequency spectrum in both the range and Doppler directions and necessitates an approximation in the determination of $f_D$ and $f_B$.

Even if in both cases the positions of the maximum on the respective frequency axis are not changed, especially the influence in Doppler direction increases with increasing bandwidth B. To compensate for this effect and compress the signal in the Doppler direction, the matched filter described in T. Wagner, R. Feger, and A. Stelzer, "*Wide-Band Range-Doppler Processing for FMCW Systems*", European Radar Conference, October 2013, pp. 160-163 can be used, for example.

In order to be able to determine the complete two-dimensional position of an object referenced to the radar unit 10, 20, in addition to the distance d the azimuth angle $\vartheta$ is required in addition to the range, i.e., the angle of incidence with which the received signal reflected at the object O was detected, wherein the azimuth angle $\vartheta$ is measured from the perpendicular of the linear receiving antenna array of the radar unit 10, 20.

The azimuth angle $\vartheta$ is typically evaluated in automotive radar units, for example, using an array of K horizontally distributed receiving antennas, which are arranged at intervals in the order of magnitude in the range of the wavelength. A so-called Uniform Linear Array (ULA) with K in a distance of $\lambda/2$ equidistantly distributed receiving antennas is shown schematically in FIG. 3.

FIG. 3 shows the extent to which the propagation-time difference $\Delta\tau$ of the received signal and thus the phase displacement $\Delta\varphi$ along the receiving antenna array is influenced by the azimuth angle (angle of incidence). Mathematically, this relationship can be described by $$\Delta\varphi = \beta \cdot \Delta\tau \cdot c = \frac{2\pi}{\lambda}\Delta\tau \cdot c = 2\pi\Delta\tau \cdot f_c. \quad (16)$$

Since especially for radar units 10, 20 in automobiles, the maximum aperture dimensions (aperture sizes) L can be affected by the far-field approximation, it can be assumed at this point that the incident wavefronts extend in parallel to each other.

Thus, the angle-dependent phase along the K receiving antenna elements can be described with a trigonometric evaluation via $$\varphi[k] = \left[1, e^{j2\pi\frac{b_2}{\lambda}\sin\vartheta}, \ldots, e^{j2\pi\frac{b_K}{\lambda}\sin\vartheta}\right], \quad (17)$$

wherein $b_k$ states the distance of the $k^{th}$ antenna to the first antenna.

To ensure that this phase offset can be digitally evaluated, each radar unit 10, 20 must be initially calibrated. With the aid of the calibration matrix used for this purpose, influences on the amplitudes and phases at the different receive channels due to manufacturing, layout and coupling can then be compensated.

To estimate the angle of incidence $\vartheta$ on the basis of the vector $\varphi[k]$ for example, direction-of-arrival (DoA) methods can be used. In some approaches, a so-called steering vector is used for this purpose, with which the signals of the K antenna elements of the receiving antenna array are weighted element by element.

One group of methods for angle estimation is the so-called beamforming (rarely also called "beam shaping"). This group includes, for example, the delay-and-sum or Bartlett beamformer and the minimum-variance distortion-less response (MVDR) or Capon beamformer. Both of the aforementioned approaches use digital beam steering to estimate the power spectral density as a function of angle.

Figures 13, 14:
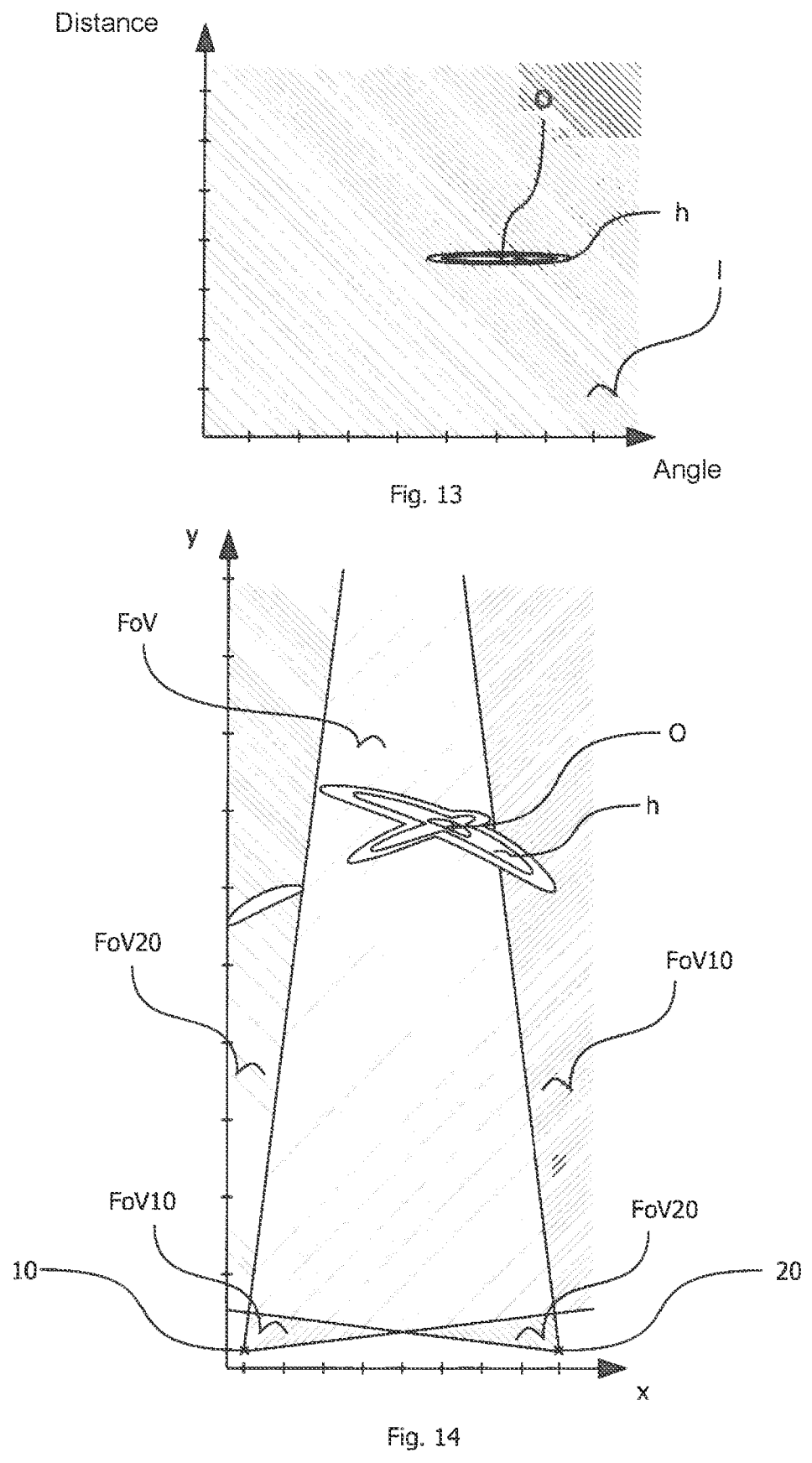

FIG. 13 schematically shows an exemplary evaluation by means of a delay-and-sum beamformer of a radar unit 10 for an object O at an (actual) distance of d=11.18 m and under an (actual) azimuth angle $\vartheta$=−26.56°.

The measured intensities are plotted in the range direction against the (azimuth) angle direction in FIG. 13. FIG. 13 is also referred to as a range-angle diagram. FIG. 13 shows a range 1 finely shaded to the upper left, in which low intensities are measured that are approximately on the order of the general noise level. Furthermore, FIG. 13 shows an area h in which contour lines of an intensity maximum are shown. In area h, intensities can be measured that are, for example, of the order of more than 3 dB, more than 5 dB, more than 10 dB, more than 15 dB or more than 30 dB above the general noise level.

In addition to beamforming, there are so-called subspace methods (rarely also called "subspace" methods), which are also attributed to imaging techniques with so-called super-resolution. Subspace methods are based on the assumption that there is a noise subspace orthogonal to the signal subspace. As an example of a subspace method, the MUltiple-Signal-Classification (MUSIC) can be mentioned.

In addition, there are other approaches for estimating the angle of incidence $\vartheta$ such as compressed sensing methods, holography methods, machine learning methods or analog beam scanning methods.

To determine the three-dimensional position of an object O, the previously described methods can be applied equivalently to the determination of the elevation angle using a receiving antenna array RX with additional vertically arranged antenna elements.

The result of a chirp sequence radar unit evaluation is a discretized, three-dimensional result space with dimensions typically defined as "range" (distance d), "Doppler" (radial velocity $v_r$) and "angle" (angle of incidence $\vartheta$).

In a next step, the information about the object in the detected area contained in the result space must be separated from the superimposed interference components such as the phase noise of the local oscillator, thermal noise, clutter or interference from other transmitters or radar units. Adaptive algorithms, such as constant false alarm rate (CFAR) methods, can be used for this purpose.

CFAR procedures can be performed in one dimension (for example, in range direction), two dimensions (in range and Doppler directions), or in three dimensions (range, Doppler, and angle directions).

Figure 4:
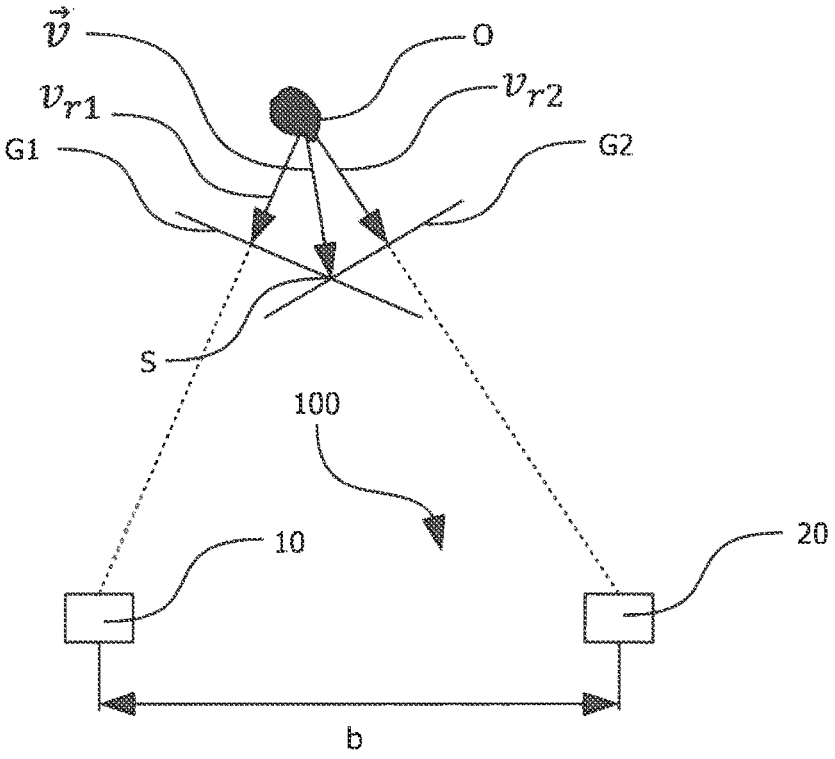
FIG. 4 shows a schematic representation of how a vector velocity for at least one resolution cell can be calculated from measurement data from at least two radar units 10, 20 of a radar system 100.

FIG. 4 shows schematically how the vector velocity for at least one resolution cell (pixel) detected, for example, as the center point (intensity maximum) of an object O, can be calculated from the measurement data of at least two radar units 10, 20 of a radar system 100.

The vector velocity of a resolution cell is composed in the local polar coordinate system of a radar unit 10, 20 from a radial velocity component $v_r$ and an angular velocity component $\omega_a$.

Via the resolution cell distance (pixel distance) $d_0$ the angular velocity can be transformed into a tangential velocity component $v_t$:

$$v_t = d_0 \cdot \omega_a \tag{18}$$

During a measurement or during the duration of a chirp sequence, both velocity components can be assumed to be constant.

The vector velocity of any resolution cell in the common field of vision FoV can be determined, for example, by determining a vector between the resolution cell under consideration and an intersection S of straight lines G1, G2 perpendicular to the end points of the radial velocity vectors.

For the considered resolution cell in this example the origin coordinates (0|0) are assumed. First, the radial velocities of the resolution cell of all radar units 10, 20, which are distinguished by the count variable j must be differentiated into their x- and y-component.

$$\vec{v}_{r,j} = \begin{pmatrix} x_j \\ y_j \end{pmatrix} \tag{19}$$

The endpoint coordinates of the radial velocity vectors are thus $(x_j|y_j)$. The straight lines perpendicular to the endpoint coordinates $G_j$ have the slope $$m_j = -\frac{x_j}{y_j} \tag{20}$$

and the y-axis section $$t_j = y_j + \frac{x_j^2}{y_j}, \tag{21}$$

which results in the following straight line equation for $G_j$:

$$y = -\frac{x_j}{y_j} \cdot x + y_j + \frac{x_j^2}{y_j}. \tag{22}$$

Starting from two radar units (J=2), the intersection of the two lines $(x_S|y_S)$ can be given as $$\begin{pmatrix} x_S \\ y_S \end{pmatrix} = \begin{pmatrix} \dfrac{t_2 - t_1}{m_1 - m_2} \\ m_1 \dfrac{t_2 - t_1}{m_1 - m_2} + t_1 \end{pmatrix}. \tag{23}$$

Since the considered resolution cell has been set as the coordinate origin, the vector velocity at this resolution cell is $$\vec{v} = \begin{pmatrix} x_S \\ y_S \end{pmatrix} - \begin{pmatrix} 0 \\ 0 \end{pmatrix} = \begin{pmatrix} x_S \\ y_S \end{pmatrix}. \tag{24}$$

Should the radar units 10, 20 be used coherently, for example by the method described in Y. Dobrev, P. Gulden, M. Christmann, M. Gottinger, and M. Vossiek, "*Radar Method and System for Determining the Angular Position, Location and/or, in Particular, Vector Velocity of a Target*,", from the patent application DE 10 2018 100 632 A1, the vector velocity can also be determined using the method described in M. Gottinger, Ch. Mammitzsch, M. Christmann, P. Gulden, and M. Vossiek, "*Method and Apparatus for Capturing the Surrounding*," described in international patent application WO 2018 158281 A1.

Figure 5:
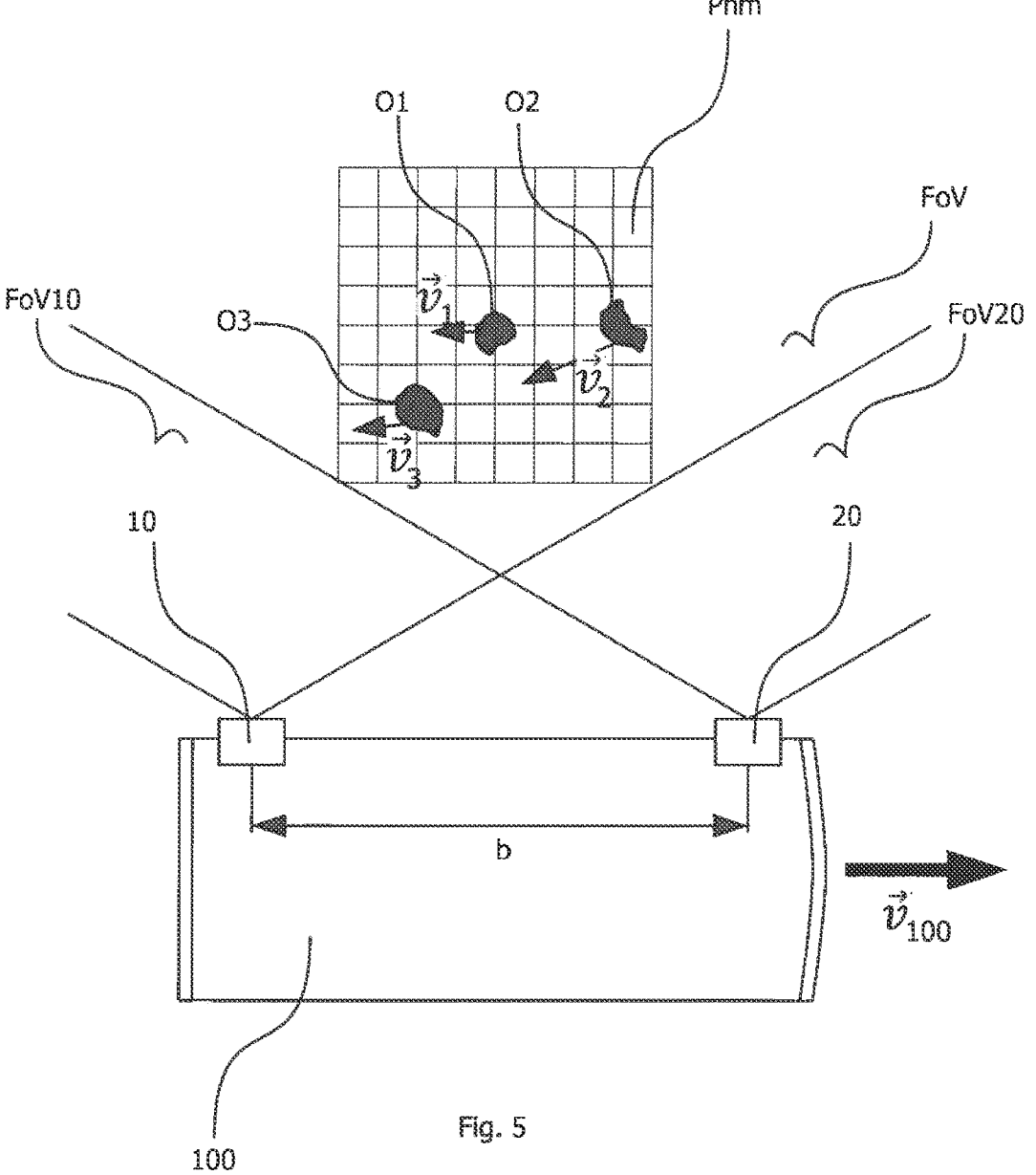
FIG. 5 shows a schematic arrangement of a radar system according to an embodiment of the invention.

FIG. 14 shows an example of measurement data from two radar units 10, 20 of the radar system 100 of the exemplary embodiment of FIG. 5 that were co-registered in a common total coordinate system. In FIG. 14, an area (the common field of vision) FoV is shown widely shaded toward the upper right. In this area, the detection areas FoV10, FoV20 of the one radar unit 10, whose detection area FoV10 is shown finely hatched towards the upper right, and the further radar unit 20, whose detection area Fov20 is shown finely hatched towards the upper left, overlap.

In this exemplary embodiment, the radar units 10, 20 each face each other by 45°. In the detection areas Fov10 and Fov20, which are only detected by the individual radar units 10, 20, a comparatively low intensity, for example of the order of magnitude of the general noise level, is measured. In the common field of vision FoV, due to the increased noise power, higher intensities, which are, for example, of the order of twice the general noise level (depending on how many radar units cover the common field of vision FoV), are measured than in the individual detection areas FoV10, FoV20.

Furthermore, areas h with contour lines are shown in FIG. 14. In the areas h shown with contour lines, even higher intensities are measured compared to the intensities measured in the other field of vision FoV, which are, for example, of the order of more than 10 dB, more than 15 dB, more than 20 dB or more than 30 dB above the noise level of the common field of vision FoV.

In the measurement shown in FIG. 14, at least two radial velocities recorded from different perspectives will be present for an object O in the common field of vision FoV.

Due to the known positions of the radar units to each other, the relative reference of the total coordinate system to each individual radar unit can be established without further ado, wherein the coordinate origin can be chosen arbitrarily. It is particularly useful to define the origin, for example, in the coordinate origin of a radar unit or on an axis centered between the radar units used.

In the total coordinate system, the area around the vehicle that can be viewed simultaneously by all radar units involved in this method is primarily suitable for the co-registered image to be generated.

A Cartesian discretization of this range that is equidistant per dimension is particularly useful. Considering the distance-dependent size of the range-angle resolution cells, a more complex discretization can also be implemented, with which total computational effort can be saved by a reduced number of cells.

The range-angle cells of all radar units involved, including the respective radial velocity profile in the corresponding cell, can be assigned to a cell of the total coordinate system, for example, by means of a two-dimensional interpolation. A linear interpolation is particularly expedient here due to the low computational effort.

For example, the range-angle data of the individual radar units can be superposed in terms of magnitude in the total coordinate system. If the radar units are operated coherently, coherent superposition by magnitude and phase is possible, but with small radar units and due to the large baseline, strong interference patterns arise.

This superposition allows an amplitude to be assigned to each resolution cell of the total coordinate system in the common field of vision, as well as a radial velocity profile per radar unit used.

For method step VS4, it is necessary that the three-dimensional range-Doppler-angle data sets are transmitted to a central computing unit. This can, for example, be integrated in a "master" radar unit if the computing capacity is sufficient. To reduce the amount of data to be transmitted, it is possible to transmit only the radial velocity with the maximum amplitude for each range angle cell. In this way, only one vector velocity can be formed per resolution cell in the common field of vision, which is, however, sufficient in most applications.

FIG. 5 illustrates an exemplary embodiment in which two radar units 10, 20 of a radar system 100 are mounted on a vehicle. The radar units 10, 20 are spaced apart from each other by the base length b. The radar units 10, 20 each detect a field of vision FoV10, FoV20. Both fields of vision FoV10, FoV20 overlap in the field of vision FoV. In the field of vision FoV in FIG. 5 there are three objects O1, O2, O3, which are moving with an (initially unknown) vector velocity $\vec{v}_1$, $\vec{v}_2$, $\vec{v}_3$ which can be determined with the method described above. The common field of vision FoV is detected by both radar units 10, 20. The measurement data of the radar units 10, 20 are co-registered and discretized in a total coordinate system.

In FIG. 5, individual resolution cells Pnm of the discretized total coordinate system are shown schematically. The radar system 100, which is attached to a vehicle in FIG.

5, also moves at a vector velocity (also initially unknown) $\vec{v}_{100}$, which can be determined using the method described above for static scenarios.

Figure 6:
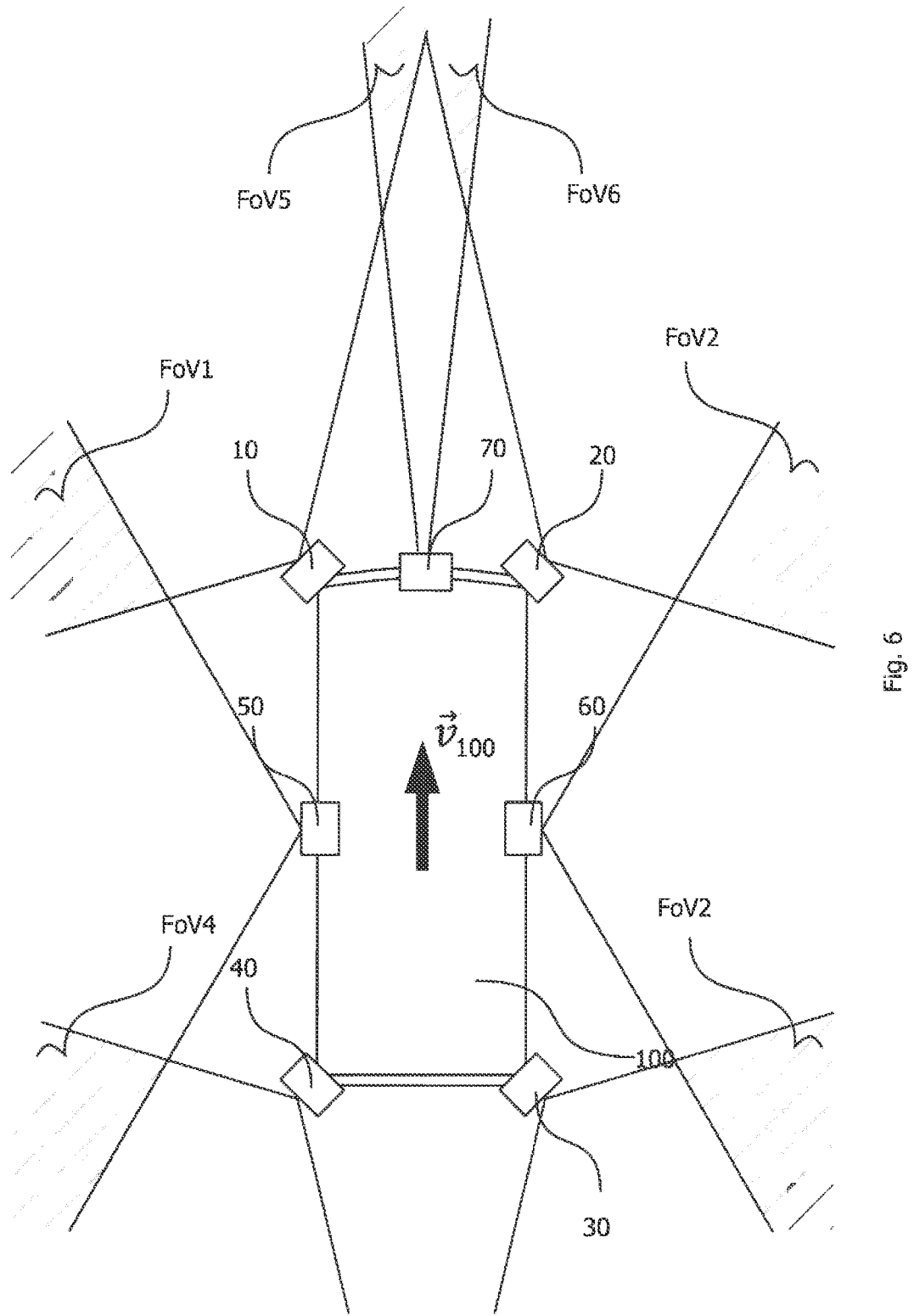
FIG. 6 shows a schematic top view of a vehicle in which a radar system with multiple radar units for ambient area detection is arranged.

In FIG. 6, a schematic top view of a vehicle is shown in which a radar system 100 is arranged that comprises seven radar units 10, 20, 30, 40, 50, 70, where the individual fields of vision of the radar units 10, 20, 30, 40, 50, 70 overlap in the fields of vision Fov1, Fov2, Fov3, Fov4, Fov5, and Fov6.

The radar units 10, 20, 30, 40, 50, 70 shown in FIG. 6 are located at positions typical for the automotive sector. For example, a long-range or full-range radar unit 70 with a larger aperture and a narrower field of vision FoV70 than the other radar units 10, 20, 30, 40, 50 and 60 is located in the front area of the vehicle. Alternatively or additionally, the radar unit 70 can also be mounted in the rear area.

FIG. 6 also shows six short-range radar units 10, 20, 30, 40, 50 and 60, each with a comparatively wide field of vision FoV10, Fov20, FoV30, FoV40, FoV50, FoV60. The fields of vision FoV10, Fov20, FoV30, FoV40, FoV50, FoV60 of radar units 10, 20, 30, 40, 50 and 60, for example, have an aperture angle of 120° in the horizontal plane.

The radar units 10, 20, 30, 40, 50, and 60 are arranged around the vehicle such that radar units 10, 20, 30, 40 are in the corners of the vehicle and radar units 50, 60 are at least substantially centered on the sides of the vehicle. The radar units 10, 20, 30, 40, 50, 60 and 70 are aligned and arranged in such a way that the ambient area around the vehicle can be covered as completely as possible.

In FIG. 6, the individual fields of vision FoV10, Fov20, FoV30, FoV40, FoV50, FoV60 of the radar units 10, 20, 30, 40, 50, 60 and 70 overlap in pairs in the common fields of vision FoV1, FoV2, FoV3, FoV4, FoV5, FoV6. The overlapping fields of vision FoV1, FoV2, FoV3, FoV4, FoV5, FoV6 are shown hatched in FIG. 6.

In the common fields of vision FoV5, FoV6 in front of the vehicle, it is possible to improve the resolution of the objects moving transversely to the direction of travel of the own vehicle, because, in particular, there are large lateral components of the object trajectories (the vector velocity of the object).

For the common fields of vision FoV1, FoV2, FoV3, FoV4 of radar units 10, 20, 30, 40, 50 and 60 in the lateral viewing direction, the angular resolution can be improved due to the direction of movement of the vehicle while driving.

Figure 7:
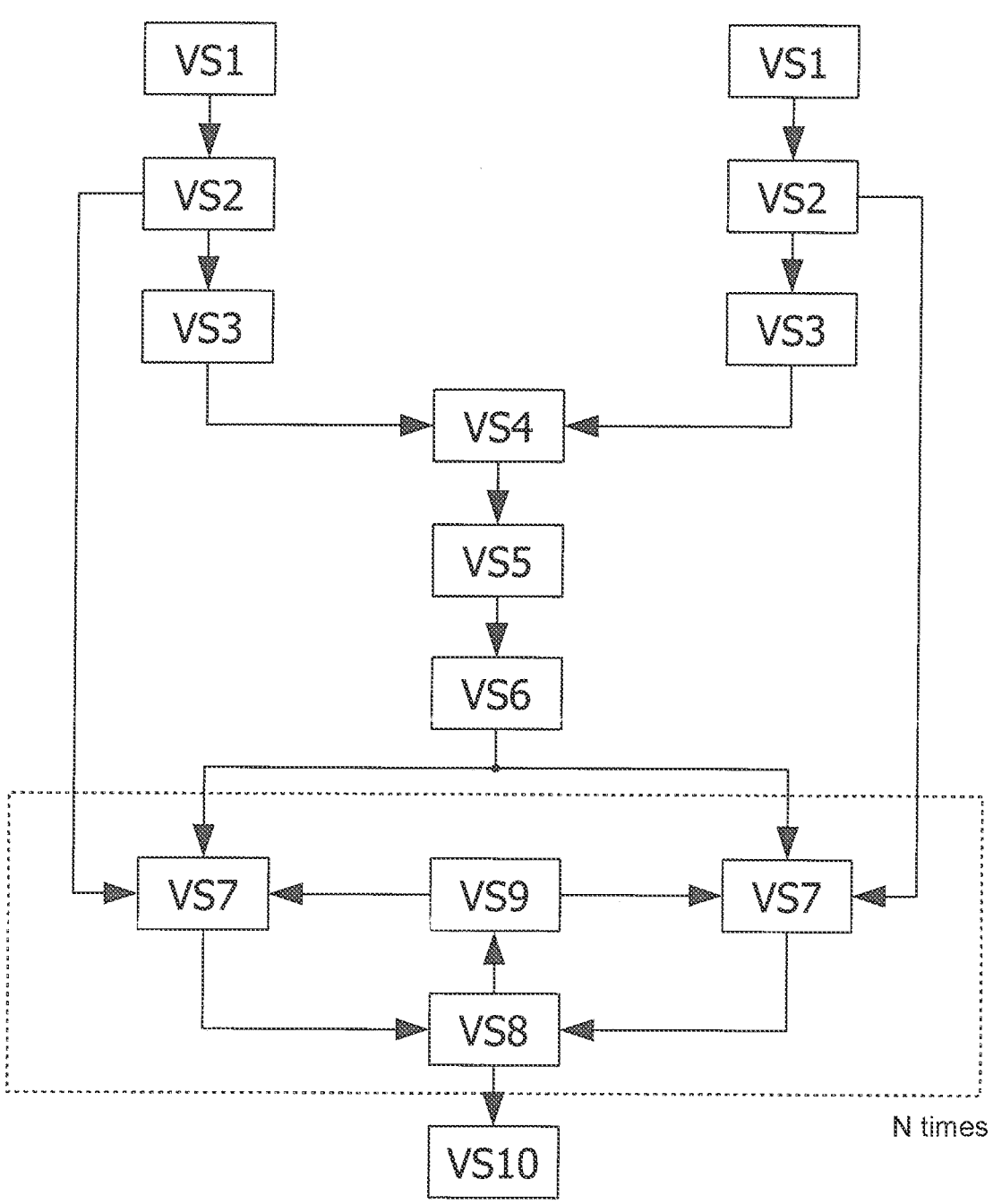
FIG. 7 shows a flow chart of a first exemplary embodiment of the invention.

FIG. 7 shows a schematic sequence of a first exemplary embodiment of the method according to the invention with the method steps VS1 to VS10. In the radar units 10, 20 of the radar system 100, method step VS1 is first performed, in which the common field of vision FoV is detected by the radar units 10, 20. The radar units 10, 20 can measure the distance, the radial velocity and the azimuth angle of reflective objects located in the common field of vision.

For the most precise determination of the vector velocity, the radar units 10, 20 are preferably the radar units with a relatively large base length b spaced apart. For example, for automobiles, base lengths of approximately 1-5 m are possible.

The radar units 10, 20 are arranged in certain installation positions, which are known, for example, to within a range of a few centimeters. The orientation of the radar units 10, 20 is also preferably known, since the orientation of the radar units 10, 20 can also have a greater effect on the image quality as the object distance increases.

Parameters of the transmit signals of the radar units 10, 20 can, for example, be dimensioned in such a way that the common field of vision FoV can be detected with a maximum measuring distance that can be reached by the individual radar units 10, 20.

In addition, the parameters of the transmit signals are set, for example, in such a way that the speeds typical of vehicles in the automotive sector can be determined unambiguously and with sufficient accuracy. For FMCW radar units, for example, this can be achieved with a sufficiently small chirp repetition rate T and a sufficiently large total measurement time IT can be achieved.

In the case of overlapping transmission times, for example, suitable multiplexing methods (time, frequency, or code multiplexing) can be used to avoid disturbing interference between the transmission signals of the individual radar units 10, 20. The use of a frequency-division multiplexing method, for example, can be particularly useful here, since the transmission signals can be transmitted offset from one another by only a few megahertz. In particular, this can lead to interference in the baseband being avoided.

The radar units 10, 20 can be used to generate beat signals in the baseband for each receive channel, as shown in equation (6). The best signals can then be further processed as digital measurement data (as a digital data stream) by analog-to-digital conversion. The further processing of the measurement data can, for example, take place in a computer module of the respective radar unit 10, 20. Alternatively, the measurement data of the individual radar units 10, 20 can also be transmitted to a (central) computing unit already in this method step VS1 in order to be processed collectively there.

In method step VS2, beat spectra are generated from the digital beat signals. In this method step, the digital beat signals are transformed into the frequency representation by a Fourier transform ("range FFT"), resulting in beat spectra with beat frequencies, such as according to equation (7). Again, the processing can be carried out either directly in a computing module of the respective radar unit 10, 20 or in a (central) computing unit.

In method step VS3, range-Doppler-angle data sets, i.e., distance, radial velocity-angle data sets, are generated for each radar unit 10, 20. For this purpose, the entire sequence from equation (8) can first be transformed into the so-called range-Doppler representation with a two-dimensional Fourier transform.

Subsequently, any method for angle estimation based on the phases along the receiving antennas can be used with equation (16). For this, it must be ensured that the measurement data of the radar units are processed taking into account the initially created calibration matrix.

Due to the low computational cost, for example, the delay-and-sum beamformer is advantageous, which can be evaluated directly by a Fourier transform for a uniform linear array (for example, as shown in FIG. 3). Also, method step VS3 can be performed either in the respective radar unit 10, 20 or in a (central) computing unit 90.

In a method step VS4, the individual range-Doppler-angle data sets generated in VS3 are co-registered in a common coordinate system (total coordinate system). To determine the vector velocities, the data sets of the individual radar units 10, 20 are coregistered in a common, "total" coordinate system so that at least two radial velocities, acquired from different perspectives, are available for at least one object in the common field of vision.

Based on the known positions of the radar units with respect to each other, the relative reference of the total coordinate system to each individual radar unit can be established, wherein the coordinate origin can be chosen arbitrarily. It is particularly advantageous to define (select) the origin, for example, at the coordinate origin of one of the radar units 10, 20 or on an axis (centered) between the radar units 10, 20 used.

The measurement data of the radar units 10, 20 co-registered in the total coordinate system can be discretized, wherein in particular an equidistant, Cartesian discretization per dimension of the measurement data can be used. Discretization of the total coordinate system generates resolution cells (pixels in the two-dimensional and voxels in the three-dimensional). More complex discretizations, for example with distance-dependent variation of the dimensions of the resolution cells, are also conceivable. Since the range resolution of the radar units is at least approximately distance independent, the resolution cells can have a constant size in the range direction, for example. Since the angular resolution is also at least approximately constant, this means in Cartesian space that the resolution cells in the azimuth direction can have larger dimensions at greater distances, since here the resolution is reduced with increasing distance.

In particular, the resolution cells in the range-angle area of all participating radar units 10, 20, including the respective radial velocity course in the corresponding resolution cell, can be assigned to a resolution cell of the total coordinate system, for example, by means of a two-dimensional interpolation. A linear interpolation can be particularly advantageous here due to the low computational effort.

The range-angle data of the individual radar units can, for example, be superposed in terms of magnitude in the total coordinate system. If the radar units are operated coherently, coherent superposition by magnitude and phase is possible. Through the superposition, an amplitude can be assigned to each resolution cell of the total coordinate system in the common field of vision, as well as a radial velocity curve for each radar unit used.

For method step VS4, it may be necessary that the three-dimensional range-Doppler-angle data sets are transmitted to a (central) computing unit 90. However, it is also conceivable that method step VS4 is carried out in a computing module of a radar unit 10, which acts as a master radar unit, for example.

To reduce the amount of data to be transmitted, it is possible to transmit only the radial velocity with the largest amplitude for each range-angle resolution cell. In this way, only one vector velocity can be formed per resolution cell in the common field of vision, which is, however, sufficient in most applications.

Figure 15:
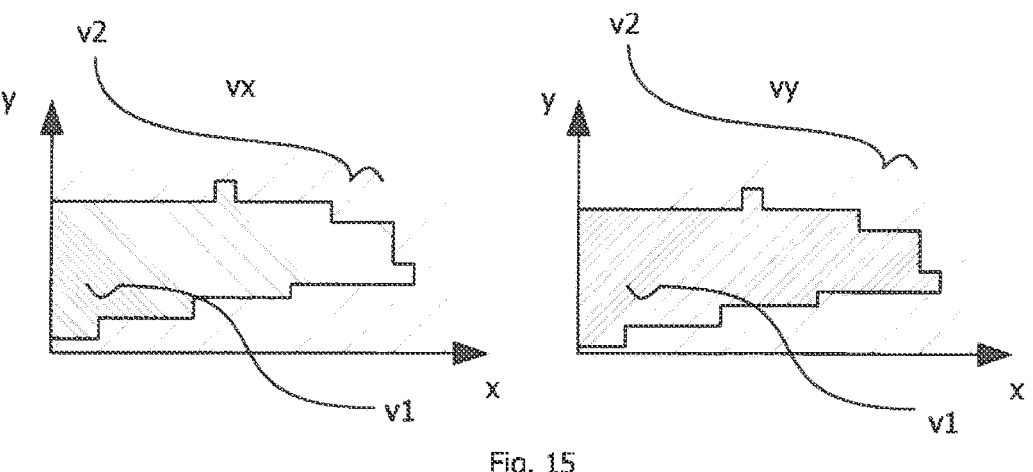
FIG. 15 shows an exemplary detailed view of the velocity components vx, vy of the determined vector velocities of a sub-field.

In method step VS5, a vector velocity of at least one resolution cell can be determined. FIG. 15 shows an example of a detailed view of the velocity components vx, vy of the determined vector velocities of a sub-field. The vector velocities are based on the maximum radial velocity of the sub-field. FIG. 15 shows an example of a velocity range v1 with a low velocity (between about 0 and −5 m/s) and another velocity range v2 with a higher velocity (between about 0 and +5 m/s).

Method step VS6 comprises the detection of objects (target detection). In this exemplary embodiment, at least one object is detected in the common field of vision. The object coordinates of the detected object in the total coordinate system can be stored in a data structure, for example a target list, with a vector velocity determined at these object coordinates. The number of objects entered in the data structure (target list) is specified with N.

The search for local amplitude maxima in the common field of vision is particularly advantageous for object detection. Suitable CFAR adaptations or constant power thresholds can be used for this purpose. Since this object detection is carried out two-dimensionally in the common coordinate system, it is indirectly applied to the range-angle data of the radar units.

Following target detection, it is possible to determine the movement of the own vehicle on the basis of the target lists (ego-motion estimation) if it can be assumed that a sufficiently large number of static targets (N) has been detected.

For this purpose, for example, the method described in D. Kellner, M. Barjenbruch, J. Klappstein, J. Dickmann, and K. Dietmayer, "Instantaneous Ego-Motion Estimation using Multiple Doppler Radars," in *IEEE International Conference on Robotics and Automation (ICRA)*, June 2014, pp. 1592-1597, can be used. A reduction in complexity can also be achieved by directly computing vector velocities into a $v_x$-$v_y$-diagram directly.

Stationary target detection can be performed using a RANdom-sample-consensus algorithm (RANSAC), as in stationary target detection. Knowledge of the own motion can then be used for SAR reconstruction of the entire field of vision of all radar units.

In method step VS7, the inverse SAR reconstruction can be performed (separately) for each detected object (target) entered in the target list, i.e. N times.

The reconstruction is carried out for a spatial area around the object (reconstruction area), assuming that the area under consideration is completely within the common field of vision of all radar units used. For example, the area can be realized as rectangular, elliptical or circular. For the example of a rectangular section, the following then applies in each case $x \in [x_n-\Delta x, x_n+\Delta x]$ resp. $y \in [y_n-\Delta y, y_n+\Delta y]$, wherein $x_n$ and $y_n$ are the coordinates of the $n^{th}$ object in the total coordinate system. It is assumed that in the reconstruction area each resolution cell moves with the target velocity $\vec{v}_n$ relative to the zero point of the total coordinate system. In each case, the inverse SAR reconstruction can be implemented using, for example, one of the following algorithms Range-Doppler, Omega-K, Phase-Shift-Migration, Holography or Extended-Chirp-Scaling.

For the discretized common field of vision, the holographic evaluation using a spatial optimal filter ("matched filter") is particularly advantageous.

The reconstruction idea is to set up for each discretized point in space $\vec{p}_{hyp}$ (x, y) a hypothetical received signal and to test the measured radar received signals whether this partial echo is contained. The signal hypothesis for each radar unit j is derived from the beat signal of each chirp i, presented in equation (6), the transmitting antenna m and the receiving antenna k at the fast time t=0:

$$s_{hyp,j,i,m,k}(x,y)=e^{j\omega_c \cdot \tau_{hyp,j,i,m,k}(x,y)} \qquad (25)$$

The hypothetical propagation time used here $\tau_{hyp,j,i,m,k}$ (x, y) is composed depending on the used radar unit j for the $i^{th}$ chirp from the propagation time from the respective transmitting antenna m to the considered resolution cell $\vec{p}_{hyp}$ (x, y) as well as from the return path to the respective receiving antenna k at the time t=iT (cf. (3)). In this case, the fact is taken into account that a target moves in the course of the slow time with the vectorial velocity $\vec{v}$(x, y).

$$\tau_{hyp,j,i,m,k}(x, y) = \frac{\|(\vec{p}_{hyp}(x, y)+ \vec{v}(x, y)\cdot iT)- \vec{p}_{TX,j,m}(t = iT)\|_2}{c} ++ \frac{\|\vec{p}_{RX,j,k}(t = iT)- (\vec{p}_{hyp}(x, y)+ \vec{v}(x, y)\cdot iT)\|_2}{c} \qquad (26)$$

22

$\|z\|_2$ specifies the Euclidean norm of the vector z.

The resolution cell-dependent hypothetical beat frequency $f_{B,hyp,j,i,m,k}$(x, y) associated with this signaling hypothesis is according to (7)

$$f_{B,hyp,j,i,m,k}(x, y) = \mu\tau_{hyp,j,i,m,k}(x, y)+ \frac{2v_{r,j}(x, y)\cdot f_c}{c}, \qquad (27)$$

wherein $v_{r,j}$(x, y) indicates the magnitude of the radial velocity at the resolution cell $\vec{p}_{hyp}$(x, y) relative to the radar unit j.

The reconstructed image of the $n^{th}$ target arises subsequently as a probability density function, which is obtained by summing with the correct propagation time and correct phase the signal components of all measurement paths (i.e., for all antenna combinations at all coordinates $\vec{p}_{hyp}$(x, y) in the section under consideration, which can be rectangular, elliptical or circular, for example). The hypothesis test is interpreted here as a conjugate complex multiplication of the hypothetical signal phase with the real measured phase at the corresponding hypothetical beat frequency. The summation is followed by a summation of the magnitude:

$$b_j(x, y) = \left| \sum_{i=1}^{I}\sum_{m=1}^{M}\sum_{k=1}^{K}\mathcal{F}\{s_{B,j}\}(f_{B,hyp,j,i,m,k}(x, y))\cdot s_{hyp,j,i,m,k}(x, y)^* \cdot w(i) \right| \qquad (28)$$

$\mathcal{F}\{s_{B,j}\}$ specifies the Fourier transform of the beat signal $s_{B,j}$. The used window function is given chirp-dependently by w(i).

It should be noted that the data of the individual radar units must be processed separately due to the lack of coherence between them. If the radar units are operated coherently, an overall evaluation of all radar units is feasible, but in the case of small radar units and large baselines, this can result in strong interference patterns.

Figure 16:
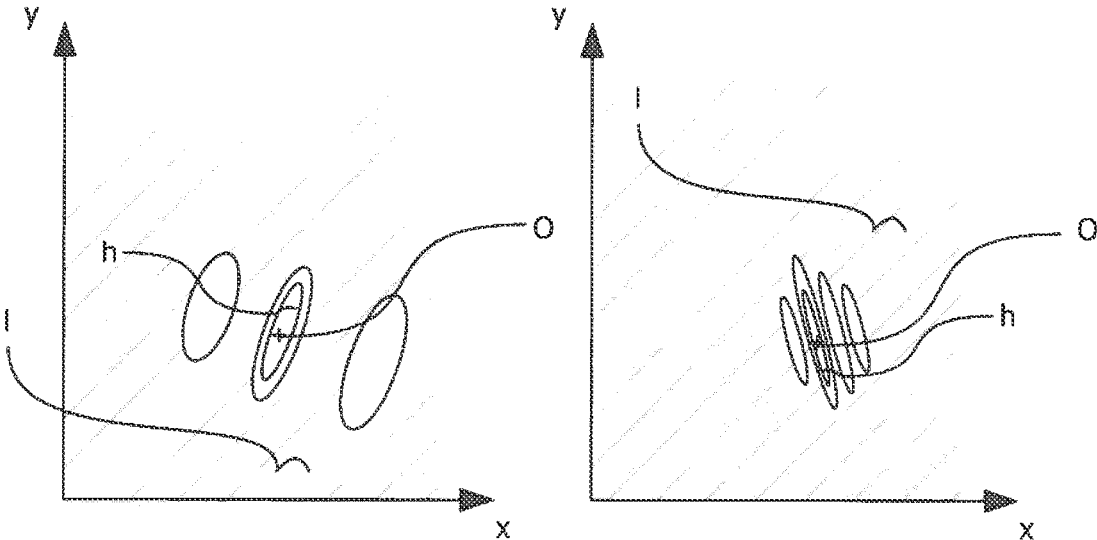
FIG. 16 shows an exemplary view of reconstruction results available after method step VS7.

FIG. 16 shows an example of the reconstruction results of the scene shown in FIG. 14 based on the vector velocity determined at the amplitude maximum. FIG. 16 shows a partial radar image for the two radar units 10, 20. The rectangular area x=[0; 1.3] m and y=[6.2; 7.7] m extends around the previously detected object O with coordinates $(x_1|y_1)$=(0.7|6.8) m. By using two radar units 10, 20, two partial radar images can be obtained $b_1$(x, y) and $b_2$(x, y) from different perspectives. If the radar units are operated coherently, a third partial radar image $b_{1\to2}$(x, y) can additionally be created on the basis of the reciprocal cross path.

FIG. 16 shows an area 1 in which a low intensity (which is, for example, of the order of (twice) the general noise level) is measured, and an area h with contour lines in which a higher intensity (which is, for example, of the order of more than 30 dB, more than 35 dB, or more than 40 dB above the noise level) is measured.

In method step VS7, N partial radar images of the reconstructed objects of the target list are calculated with an increased angular resolution and sharper contours. To create an overall image and/or to reduce errors, method steps VS10 and/or VS8 and VS9 can optionally be performed.

In method step VS8, the errors can be determined if the vector velocity determined in method step VS7 was erroneous. Errors in determining the vector velocity can cause systematic phase errors in the inverse SAR reconstruction in equation (28). This may result in all affected objects being reconstructed with a position error. However, the error may be different due to the different radial velocities for the reconstruction of each radar unit 10, 20.

To estimate this error, the reconstructed images of the different radar units 10, 20 can be compared. For example, this is possible via a renewed CFAR-based target detection. Here, it is investigated whether the deviation of the target positions in the different images is larger than a previously defined threshold value.

Alternatively, the differences between the different images can be evaluated, for example. If the difference amplitudes are above a threshold value, which is also defined in advance, this indicates an incorrect position of the targets.

The position errors can be reduced by an iterative correction in method step VS9 until the correct or sufficiently accurate vector velocities have been found and the target positions have been determined (sufficiently) accurately.

If the error analysis in method step VS8 does not indicate that position errors have occurred, the reconstruction results for this detection can be processed directly in method step VS10.

In particular, the vector velocity may be incorrectly determined if two or more objects, which do not necessarily have different vector velocities, cannot be resolved in the range-angle dimension in the common field of vision. In this case, it is possible that a common amplitude maximum for all objects involved occurs at the center of gravity of the objects. This maximum is then defined as the detected object in method step VS6 and the velocity at these putative target coordinates is used in the ISAR reconstruction.

For a movement of the objects, however, object trajectories arise, with which a resolution improvement can be achieved, so that the different objects can be separated and resolved in the images $b_j(x, y)$ after the ISAR reconstruction. If, for example, all objects involved in the detected overall target have the same or a very similar vector velocity, the velocity recorded in the target list is only subject to a small error. The error arises from the fact that the vector velocity in method step VS5 is carried out by the geometric evaluation at a center of gravity shifted due to the error as target coordinates.

However, if the objects involved have different actual velocities, another error component can be added and the deviation of the determined vector velocity from the actual vector velocities can increasingly deviate.

Figure 17:
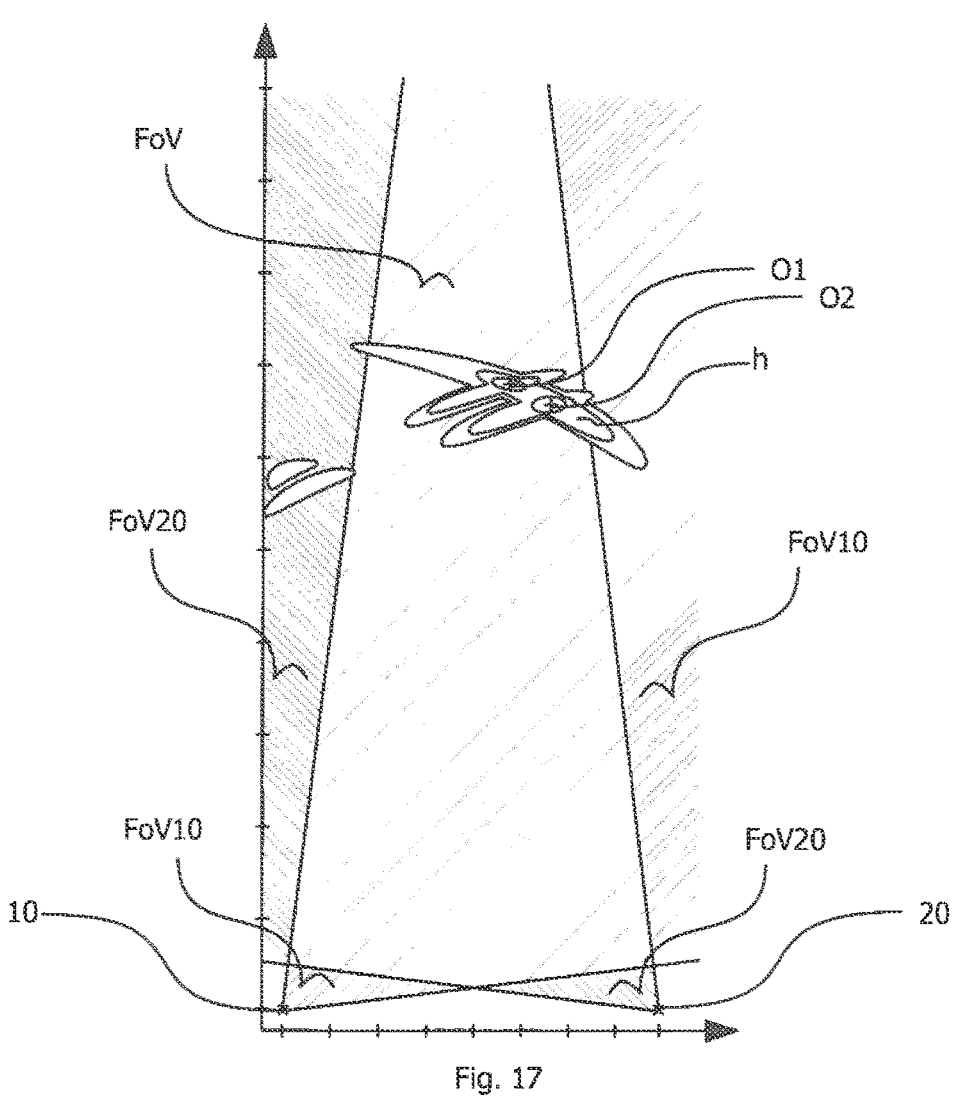
FIG. 17 shows an example of measurement data of two radar units co-registered in a common total coordinate system, which are available after the method step VS4, with two objects lying close to each other.

FIG. 17 shows a schematic representation of two objects (point targets) O1, O2, which are only a short distance apart. In FIG. 14 the objects O1, O2 are arranged by way of example at $(x_1, y_1)=(0.7|6.8)$ m and $(x_2, y_2)=(0.5|7)$ m in the common field of vision. A precise resolution of both targets is no longer possible here. The respective actual vector velocities of the objects O1, O2 are for example $\vec{v}_1=(-7|-4)$ m/s resp. $\vec{v}_2=(-6.8|-3.8)$ m/s.

Figure 18:
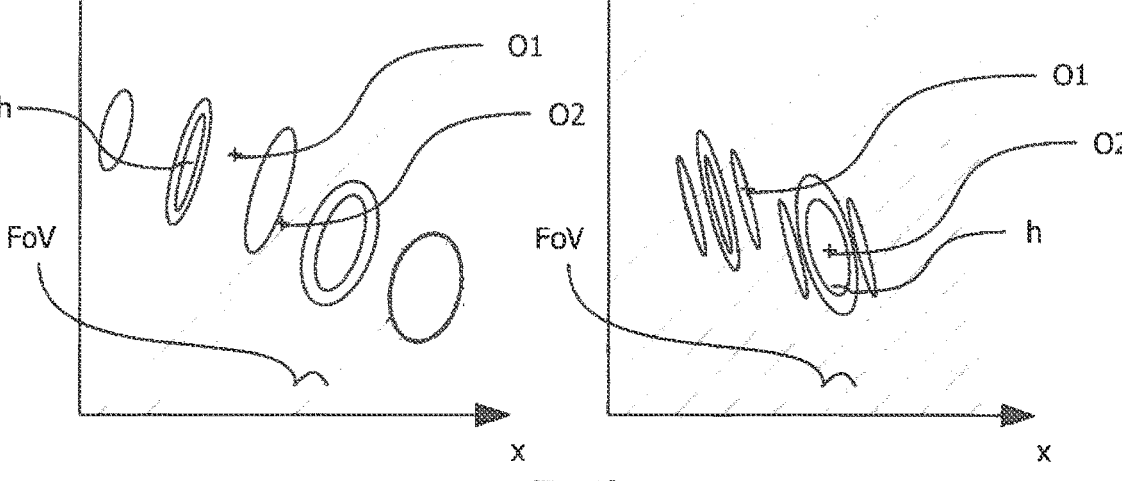
FIG. 18 shows a schematic representation, reconstruction results for a post inverse SAR reconstruction based on an erroneous vector velocity.

In method step VS5, however, the erroneous vector velocity is determined at the amplitude maximum $\vec{v}_{ISAR}=(-6.7|-3.9)$ m/s. The vector velocity SAR determined with errors leads, as shown schematically in FIG. 18, to a position error after the inverse SAR reconstruction, which depends on the evaluated radar unit 10, 20.

If it is determined in method step VS8 that one or more objects for the considered $n^{th}$ reconstruction process under consideration (step VS7) have been reconstructed with an incorrect position, the vector velocity on which the reconstruction is based can be changed in a separate correction step (in method step VS9) and the reconstruction can be carried out again in method step VS7 for the corresponding $n^{th}$ target list entry with the changed (adjusted) vector velocity.

Correction step VS9 can be repeated until a predefined error threshold for method step VS8 is not exceeded. In this case, the vector velocity in the $n^{th}$ target list entry can be substituted by the modified (adjusted) vector velocity used in the last reconstruction. The correction speed required for correction step VS9 can, for example, be determined analytically via the radar-unit-specific position deviation from the original target list position. Additionally or alternatively, a SAR autofocus algorithm such as a phase-gradient autofocus method can be used as correction step VS9, for example.

In method step VS10, an overall radar image can be generated from all partial radar images. In the method steps VS7 to VS9, a total of N radar images are generated in the common field of vision of the radar units 10, 20 used.

For many automotive radar applications, it may be sufficient to further process the partial radar images generated with enhanced angular resolution. Since on the one hand the angular resolution is improved in the partial radar images and on the other hand the object contours are more sharply mapped, it may sometimes be preferable to generate and evaluate an overall radar image of the amplitude distribution in the common field of vision. For example, this would enable further object detection or classification in the overall radar image, where (due to the sharper mapping of object contours) cluster analysis techniques such as Density-Based-Spatial-Clustering-of-Applications-with-Noise DBSCAN or Connected-component-labeling CCL can be applied, for example. Alternatively, it is also conceivable to apply the total radar method for pattern or image recognition.

The generation of an overall radar image of the common field of vision can be carried out, for example, in such a way that the image generated by co-registration in method step VS4 is selected as the lowest level. The N reconstruction images (partial radar images) can then be inserted into the corresponding sub-fields by means of a suitable arithmetic operation, such as addition, multiplication or substitution. In the case of multiplication, the reconstructed images act as a kind of template, whereby greater contour sharpening can be achieved. Here it is either possible to generate a separate overall radar image for each of the radar units used or to select a combination of all radar units, in which case the data should preferably be superimposed in a non-coherent manner.

Figure 8:
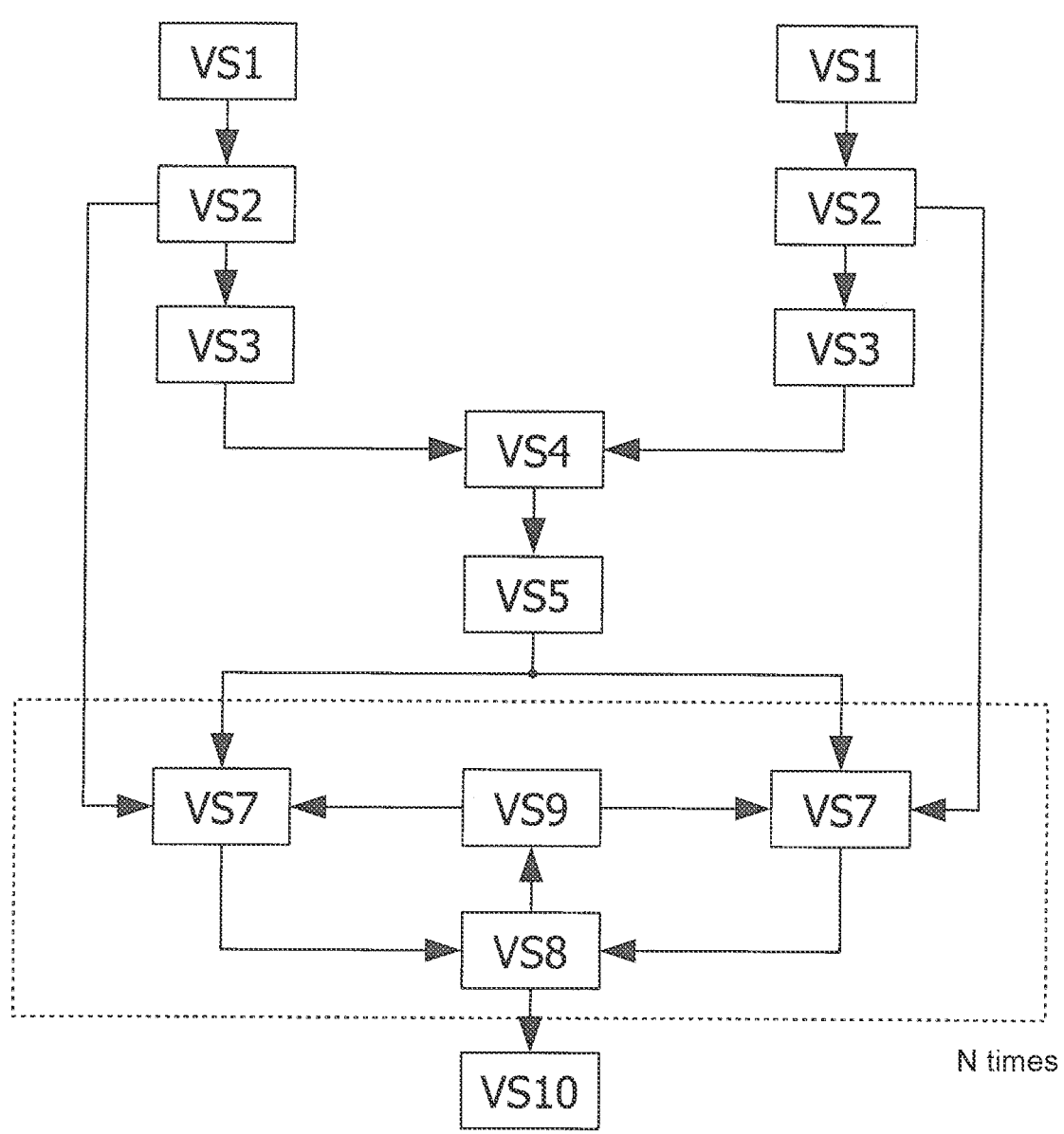
FIG. 8 shows a flow chart of a second exemplary embodiment of the invention.

FIG. 8 shows a flow chart of a second exemplary embodiment of the method according to the invention. In the second exemplary embodiment, the inverse SAR reconstruction in method step VS7 is carried out with the vector velocities for at least some of the resolution cells, in particular for all resolution cells.

The method steps VS1 to VS5 are carried out as previously described with reference to FIG. 7. In the second exemplary embodiment, however, method step VS6 (object detection) is not performed. Instead, in the inverse SAR reconstruction in method step VS7, each resolution cell of the common field of vision is processed in one pass at the vector velocity determined for the respective resolution cell in method step VS5.

The error correction performed in steps VS8 and VS9 can be applied to the entire common field of vision, identifying, for example, areas where the vector velocity used for reconstruction was not correctly determined.

The overall radar image generated in step VS10 is now no longer composed of N individual image sections, the partial radar images, whereby the computational complexity can be reduced at this point. The final fusion of the individual total images of the different radar units is carried out as described above.

Since this avoids target detection (e.g., implemented with a CFAR method) and an N-times repeated run of the method steps VS7 to VS9 are avoided, the computational effort of the overall method can be reduced. On the other hand, the quality of the reconstruction results can decrease due to the resolution cell-wise (pixel-wise) processing in contrast to the target-specific processing with constant vector velocities.

Figure 9:
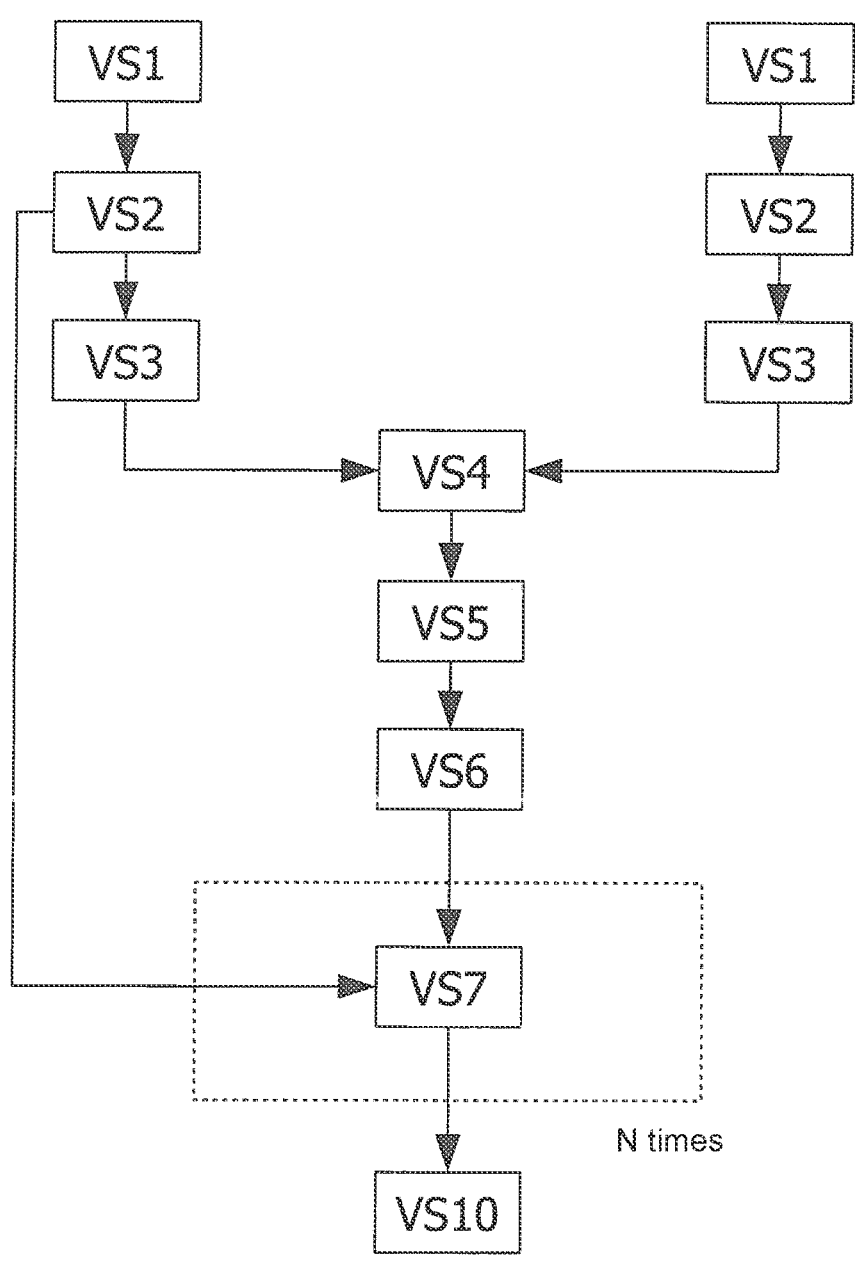
FIG. 9 shows a flow chart of a third exemplary embodiment of the invention.

FIG. 9 shows a flow chart of a third exemplary embodiment of the method according to the invention. In the third exemplary embodiment, an inverse SAR reconstruction is carried out in method step VS7 using only the measurement data of a radar unit 10 and without error correction (method steps VS8 and VS9). In this exemplary embodiment, the method steps VS1 to VS6 are carried out unchanged. However, in the second exemplary embodiment from FIG. 9, only the measurement data of a radar unit 10 are used for the inverse SAR reconstruction in method step VS7.

As a result, correction steps VS8 and VS9 are omitted in the third exemplary embodiment. Since in method step VS7 only one reconstruction result is calculated for each detected object O (in the first and second exemplary embodiments at least two reconstruction results are calculated in method step VS7 for each detected object O), a determination of possible errors (an error analysis) and thus also a correction of the vector velocities determined with errors cannot be performed. The use of an autofocus algorithm such as phase-gradient autofocus is nevertheless possible, since this does not require at least two reconstruction results.

The N reconstruction results of the detected objects O can be entered into an overall radar image in a method step VS10, wherein in this case a fusion of the reconstructions (partial radar images) of other (further) radar units 20 for the respective detected N objects is omitted.

In the third exemplary embodiment, the computational effort is reduced especially in method step VS7, since on the one hand only one data set of a radar unit 10 is processed in method step VS7 and on the other hand an iterative correction (method steps VS8 and VS9) is not performed. However, the resulting overall radar image cannot benefit from capturing the scenery from different perspectives of the different radar units 10, 20 and reconstructed objects cannot be confirmed or refuted and corrected by other images.

Figure 10:
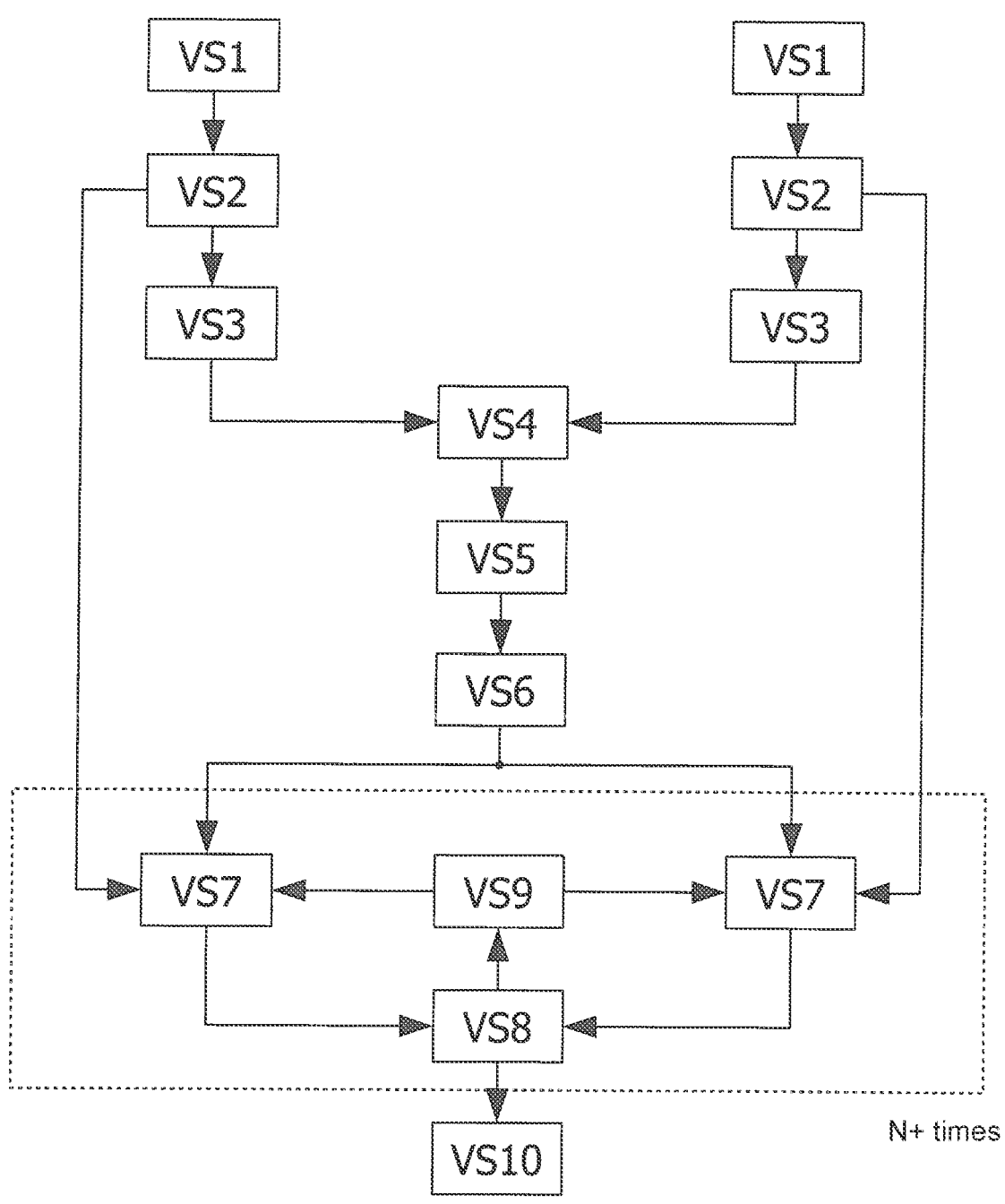
FIG. 10 shows a flow chart of a fourth exemplary embodiment of the invention.

FIG. 10 shows the schematic sequence of a fourth exemplary embodiment of the method according to the invention. In the fourth exemplary embodiment, objects are already detected in method step VS2, in the range-Doppler diagram. The method steps VS1 to VS4 are performed as described for the first to third exemplary embodiments. However, in method steps VS5 and VS6 in the fourth exemplary embodiment, it is checked whether several targets with different vector velocities are located in a range-angle cell in the common field of vision. For this purpose, for example, a two- or three-dimensional CFAR adaptation can be applied to the three-dimensional range-Doppler-angle data sets from method step VS3.

In the fourth exemplary embodiment, it is possible to determine multiple vector velocities for a range-angle resolution cell. The number of vector velocities that can be evaluated is determined by the position and the number of radar units used. The created target list consequently consists of $N^+ \geq N$ detections, which can subsequently be further processed in method steps VS7 to VS10, which can be applied unchanged to the first to third exemplary embodiments.

The fourth exemplary embodiment is particularly advantageous when a larger number of radar units 10, 20 are used, since this makes it easier to assign the different radial velocity profiles. Although the complexity and the computational effort increase slightly, the velocity resolution of the individual radar units can be at least partially exploited, which improves the overall image quality.

Figure 11:
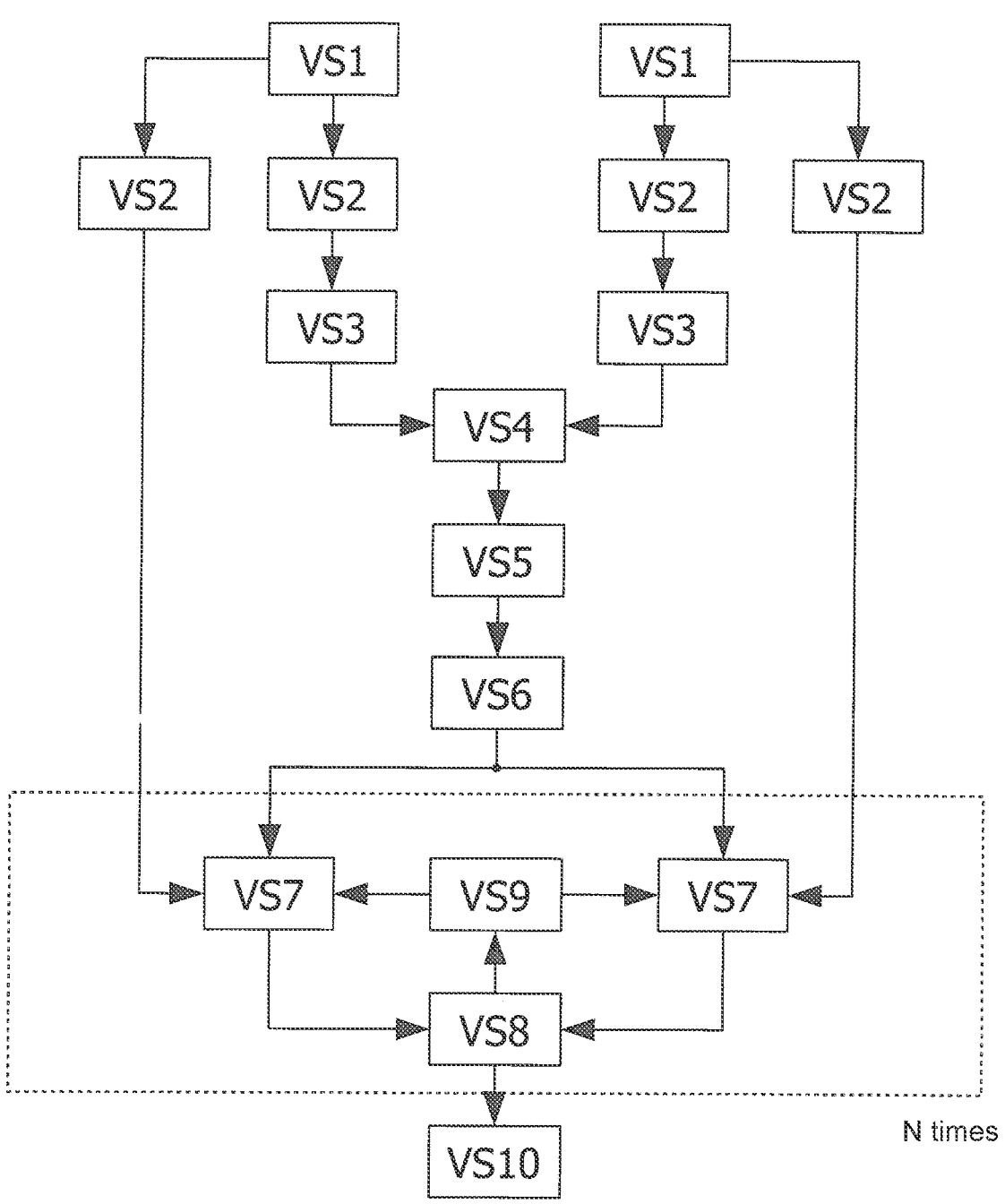
FIG. 11 shows a flow chart of a fifth exemplary embodiment of the invention.

FIG. 11 shows the schematic sequence of a fifth exemplary embodiment. In the fifth exemplary embodiment, the inverse SAR reconstruction in method step VS7 is carried out with an extended measurement time and, for example, with an at least partially separate velocity measurement. The inverse SAR reconstruction in method step VS7 and the velocity measurement can be performed on the basis of measurement data, wherein the measurement data can be composed of at least partially different radar measurements (for example, an acquisition of the common field of vision with a predetermined number of chirps). For example, the involved (at least two) radar units 10, 20 can each transmit a sequence of 1024 temporally equidistant chirps. A smaller number of successive chirps, for example 256, would be possible for determining the vector velocities and detecting the target in method steps VS3 to VS6.

For the inverse SAR reconstruction in method step VS7 and, optionally, VS8 to VS10, the 1024 chirps, and thus 1024 Fourier-transformed, digital beat signals can be used, for example. This allows the captured scene to be viewed for a longer measurement time. If the spatial sampling criterion is observed, only every second or third chirp, for example, can be used for the inverse SAR reconstruction.

By limiting the chirps used in method steps VS3 to VS6 and thinning the measurement data (as described above) for method steps VS7 to VS10, the computational effort does not increase particularly much, but significantly longer measurement times (as in the previously described example by a factor of 4 or even a larger factor) can be realized. As a result, the lengths of the trajectories caused by the target movement can increase during the measurement, whereby larger apertures can be synthesized and an improvement of the resolution (as in the previously described example by a factor of 4 at best) can be achieved.

Figure 12:
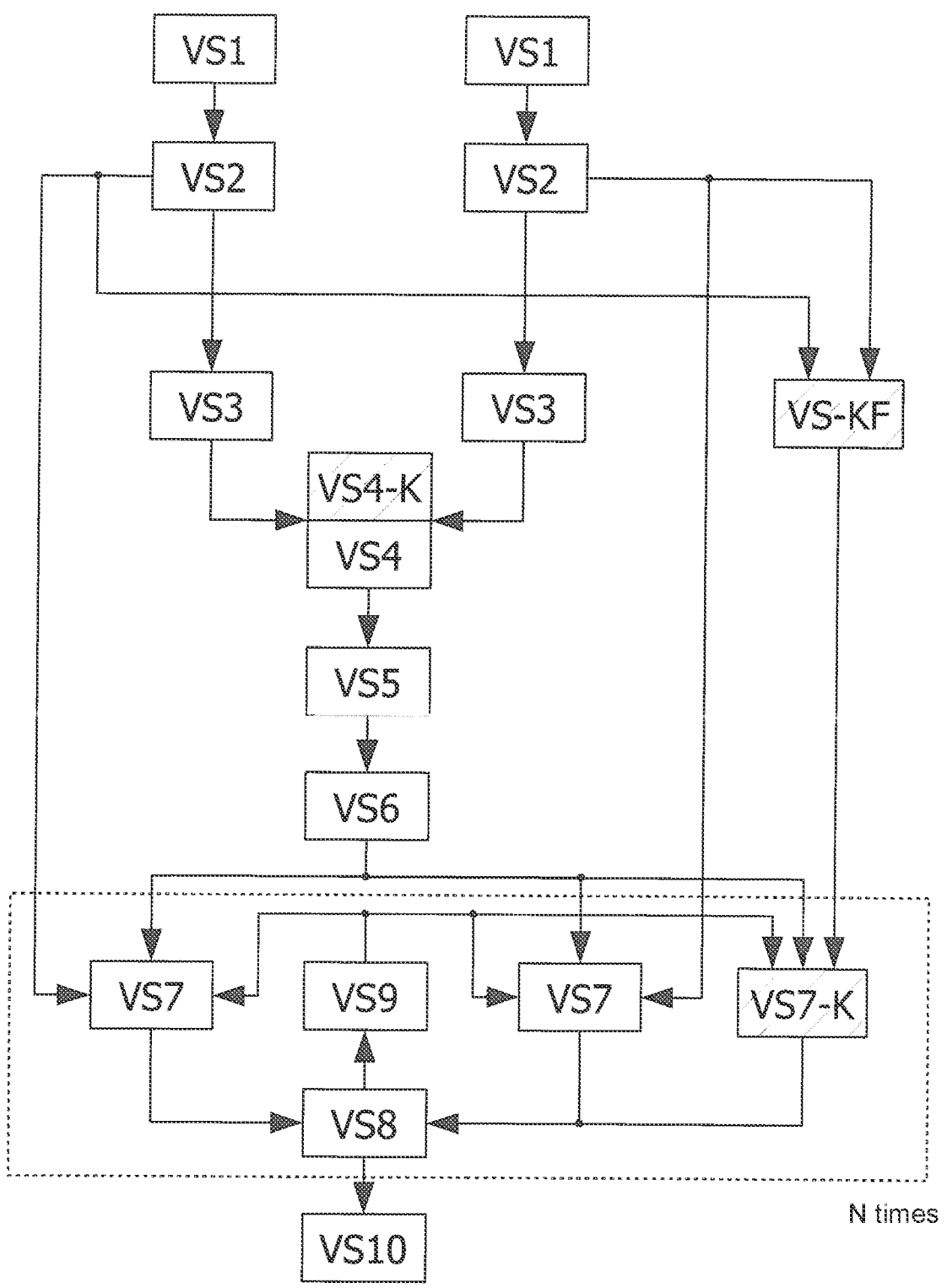
FIG. 12 shows a flow chart of a sixth exemplary embodiment of the invention.

In FIG. 12, the sequence of a sixth exemplary embodiment is illustrated. In the sixth exemplary embodiment, the radar units 10, 20 are operated coherently, so that coherent processing, in particular also the use of the cross paths of the radar units 10, 20, is enabled in the inverse SAR reconstruction in method step VS7-K. In method step VS4, the measurement data of the cross paths of the radar units are also co-registered in the total coordinate system (method step VS4-K). In the sixth exemplary embodiment, after an initial data exchange in method step VS1 after method step VS2 has been performed, the beat signals of the cross paths of the radar units 10, 20 are also available in the beat spectrum. Since the cross paths between two radar units 10, 20 can be assumed to be reciprocal for coherently operated radar units 10, 20, the two cross path spectra can be fused in a VS-KF method step, increasing the signal-to-noise ratio for the cross path.

The processing can now be extended in such a way that in the inverse SAR reconstruction in method step VS7-K and in the optional error analysis in method steps VS8 and VS9, the reconstruction of the merged cross path can additionally be taken into account. On the one hand, this results in a gain in perspective, and on the other hand, the signal-to-noise ratio increases, enabling an improved evaluation of an overall radar image generated in method step VS10.

At this point it should be noted that all the parts described above, taken individually and in any combination, in particular the details shown in the drawings, are claimed to be essential to the invention. Modifications thereof are familiar to those skilled in the art.

LIST OF REFERENCE SIGNS

10, 20, 30, 40, 50, 60, 70, Multiple radar units of a radar system;
90 (Central) computing unit;
100 Radar system;
ADC Analog-to-digital converter;
b Base length;
FoV Common field of vision of at least two radar units;
FoV10, FoV20 Individual fields of vision of radar units;
FoV1, FoV2, FoV3, Common fields of vision of several radar units;
FoV4, FoV5, FoV6
G1, G2 Straight lines;
h Range in which a high intensity is measured;
1 Range in which a low intensity is measured
LO Local oscillator of a radar unit;
M High frequency mixer;
MG Modulation generator;
O, O1, O2, O3 Objects in a captured scene;
RX Receiving antenna array;
S Intersection;
TX Transmitting antenna (transmitting antenna array);
VS1, . . . VS10 Method steps;
VS4-K Co-registering of the measurement data for the cross path;
VS-KF Merging of the measurement data for the cross path;
VS7-K Generating a partial radar image with the measurement data for the cross path;
vx, vy Components of a determined vector velocity;
v1 Velocity range with a low speed;
v2 Velocity range with a high speed;
$\vec{v}$ Vector velocity;
$\vec{v}_1$, $\vec{v}_2$, $\vec{v}_3$ Vector velocity of individual objects;
$\vec{v}_{100}$ Vector velocity of the radar system;
$\vec{v}_{ISAR}$ Erroneous vector velocity;
$d_1$, $d_2$ Distance data;
$v_{r1}$, $v_{r2}$ Radial velocity data;
$\vartheta_1$, $\vartheta_2$ Angle data;

The invention claimed is:

1. A method for signal processing of radar signals of a radar system comprising at least two radar units arranged at a known distance from one another, the method comprising:
capturing at least one spatial field of vision (FoV) of the radar system with radar signals of the at least two radar units;
generating a discrete total coordinate system of the field of vision (FoV), wherein the discrete total coordinate system provides a common reference frame for measurement data from the at least two radar units, in which measurement data of the at least two radar units of the radar system generated by the capturing of the field of vision (FoV) are co-registered based on the distance between the at least two radar units;

determining a multidimensional, vector velocity for at least one resolution cell of the discrete total coordinate system, or a multidimensional, vector velocity for the radar system, from the co-registered measurement data of the at least two radar units;
reconstructing at least one spatial sub-field of the field of vision (FoV) using the determined vector velocity or the vector velocity for the radar system and with the measurement data of at least one of the radar units;
detecting at least one object located in the field of vision (FoV) in the discrete total coordinate system, by determining amplitude maxima using dynamic or constant power thresholds, wherein the multidimensional, vector velocity of at least one resolution cell is determined for the at least one detected object from the co-registered measurement data of the at least two radar units;
comparing a partial radar image generated by one of the at least two radar units for a spatial sub-area of the field of vision (FoV) in which the at least one resolution cell or the at least one detected object is located, with the partial radar image of a same spatial sub-area generated by another of the at least two radar units; and
in response, when the comparing the partial radar images reveals that there is a difference between the two partial radar images that exceeds a predetermined threshold, adjusting the vector velocity (v) by a vector velocity change (Δv);
wherein the comparing and adjusting is iteratively repeated until the difference between the two partial radar images is below the predetermined threshold.

2. The method according to claim 1, wherein reconstructing comprises:
generating at least one partial radar image for a spatial sub-field of the field of vision (FoV), in which the at least one resolution cell is located, using the measurement data of at least one of the radar units and using the determined vector velocity of the at least one resolution cell, using an inverse synthetic aperture radar method.

3. The method according to claim 1, wherein reconstructing comprises:
generating at least one ambient radar image for a spatial ambient area detected by at least one of the radar units based on the measurement data of the at least one radar unit detecting the ambient area and based on the vector velocity ($v_{100}$) of the radar system, using a synthetic aperture radar method.

4. The method according to claim 1, wherein for a spatial sub-field of the field of vision (FoV) in which the at least one detected object is located, at least one partial radar image is generated based on the measurement data of at least one of the radar units and based on the vector velocity assigned for the at least one detected object, using an inverse synthetic aperture radar method.

5. The method according to claim 4, wherein at least one vector velocity error of the determined vector velocity of the at least one resolution cell or of the at least one detected object is determined and corrected from respective partial radar images generated from measurement data of the two radar units.

6. The method according to claim 1, wherein a plurality of objects located in the field of vision (FoV) are detected in the discrete total coordinate system, wherein for each detected object a multidimensional, vector velocity of at least one resolution cell is determined from the co-registered measurement data of the at least two radar units, and wherein for each detected object a partial radar image is generated based on the measurement data of at least one of the radar units and based on the vector velocities of the respective detected objects, using an inverse synthetic aperture radar method.

7. The method according to claim 1, wherein the measurement data of the respective radar units generated by detecting the field of vision (FoV) includes distance data, radial velocity data and angle data, wherein the angle data comprises angle data in azimuth direction and in elevation direction.

8. The method according to claim 1, wherein for generating the discrete total coordinate system an equidistance-based discretization or a Cartesian discretization of the field of vision (FoV) represented in the total coordinate system is carried out.

9. The method according to claim 8, wherein, to generate the discrete total coordinate system, the distance data and angle data of the radar units are superposed in terms of magnitude.

10. The method according to claim 1, wherein an inverse synthetic aperture radar method is applied to a spatial sub-field in the discrete total coordinate system in which a detected object is located, wherein the sub-field has a rectangular shape, an elliptical shape, or a circular shape.

11. The method according to claim 10, wherein the inverse synthetic aperture radar method comprises one of: Range-Doppler, Omega-K, Phase-Shift Migration, Holography, or Extended-Chirp Scaling.

12. The method according to claim 1, wherein an overall radar image is generated from individual partial radar images of the respective radar units.

13. The method according to claim 1, wherein determining a multidimensional, vector velocity is carried out for at least part of the resolution cells of the discrete total coordinate system of the field of vision (FoV) from the co-registered measurement data of the at least two radar units, and wherein at least a portion of the field of vision (FoV) is processed in the discrete total coordinate system using an inverse synthetic aperture radar method.

14. The method according to claim 1, wherein a detection of at least one object located in the field of vision (FoV) is carried out in a distance-radial velocity diagram or a distance-angle diagram generated from the measurement data of one of the radar units by determining amplitude maxima using dynamic or constant power thresholds.

15. The method according to claim 14, wherein for at least one resolution cell of the discrete total coordinate system of the field of vision (FoV) a plurality of multidimensional, vector velocities are determined from the co-registered measurement data of the at least two radar units, provided that a plurality of objects are detected for the resolution cell in the distance-radial velocity diagram or in the distance-angle diagram.

16. The method according to claim 1, wherein the capturing of the at least one field of vision (FoV) of the radar system is repeated periodically, wherein the measurement data of the radar units are combined into an overall measurement data set.

17. The method according to claim 1, wherein measurement data of cross paths of the radar signals between the radar units of the radar system are operated coherently.

18. A radar system comprising at least two radar units arranged at a known distance from one another, the radar system configured to:

capture at least one spatial field of vision (FoV) of the radar system with radar signals of the at least two radar units;

generate a discrete total coordinate system of the field of vision (FoV), wherein the discrete total coordinate system provides a common reference frame for measurement data from the at least two radar units, in which measurement data of the at least two radar units of the radar system generated by the capturing of the field of vision (FoV) are co-registered based on the distance between the at least two radar units;

determine a multidimensional, vector velocity for at least one resolution cell of the discrete total coordinate system, or a multidimensional, vector velocity for the radar system, from the co-registered measurement data of the at least two radar units;

reconstruct at least one spatial sub-field of the field of vision (FoV) using the determined vector velocity or the vector velocity for the radar system and with the measurement data of at least one of the radar units;

detect at least one object located in the field of vision (FoV) in the discrete total coordinate system, by determining amplitude maxima using dynamic or constant power thresholds, wherein the multidimensional, vector velocity of at least one resolution cell is determined for the at least one detected object from the co-registered measurement data of the at least two radar units;

compare a partial radar image generated by one of the at least two radar units for a spatial sub-area of the field of vision (FoV) in which the at least one resolution cell or the at least one detected object is located, with the partial radar image of a same spatial sub-area generated by another of the at least two radar units; and in response, when the comparing the partial radar images reveals that there is a difference between the two partial radar images that exceeds a predetermined threshold, adjust the vector velocity (v) by a vector velocity change (Δv);

wherein the comparing and adjusting is iteratively repeated until the difference between the two partial radar images is below the predetermined threshold.

* * * * *